(12) United States Patent
Koppetz

(10) Patent No.: US 12,212,875 B2
(45) Date of Patent: *Jan. 28, 2025

(54) BACKGROUND DISPLAY SYSTEM

(71) Applicant: Arnold & Richter Cine Technik Gmbh & Co. Betriebs KG, Munich (DE)

(72) Inventor: Michael Koppetz, Munich (DE)

(73) Assignee: Arnold & Richter Cine Technik Gmbh & Co. Betriebs KG, Munich (DE)

( * ) Notice: Subject to any disclaimer, the term of this patent is extended or adjusted under 35 U.S.C. 154(b) by 44 days.

This patent is subject to a terminal disclaimer.

(21) Appl. No.: 18/138,628

(22) Filed: Apr. 24, 2023

(65) Prior Publication Data

US 2023/0262188 A1    Aug. 17, 2023

Related U.S. Application Data

(63) Continuation of application No. 17/382,214, filed on Jul. 21, 2021, now Pat. No. 11,665,307.

(30) Foreign Application Priority Data

Jul. 24, 2020    (DE) ..................... 10 2020 119 601.6

(51) Int. Cl.
    *H04N 5/222* (2006.01)
    *G06F 3/01* (2006.01)
    (Continued)

(52) U.S. Cl.
    CPC ........... *H04N 5/2224* (2013.01); *G06F 3/011* (2013.01); *G06F 3/014* (2013.01); *G06F 3/147* (2013.01);
    (Continued)

(58) Field of Classification Search
    CPC .......... G06F 3/011; G06F 3/014; G06F 3/015; G06F 3/016; G06F 3/017; G06F 3/04815;
    (Continued)

(56) References Cited

U.S. PATENT DOCUMENTS 5,949,433 A    9/1999  Klotz
6,271,890 B1   8/2001  Tamir et al.
(Continued)

FOREIGN PATENT DOCUMENTS

CN    112311965 A    2/2021
DE    197 14 101 C2  10/1997
(Continued)

OTHER PUBLICATIONS

German Search Report in related German Patent Application No. 10 2020 119 601.6 (eight pages).
(Continued)

*Primary Examiner* — Vijay Shankar
(74) *Attorney, Agent, or Firm* — Kilpatrick Townsend & Stockton LLP

(57) ABSTRACT

A background display system for a virtual image recording studio comprises a background display device which is configured to display, behind or above a real subject, a representation of a virtual background for a recording by means of an associated camera, and a control device which is configured to control the background display device. The control device comprises a data input for receiving lens data from the associated camera and is configured to adjust the representation of the virtual background in dependence of the received lens data.

28 Claims, 15 Drawing Sheets

Figure 1:
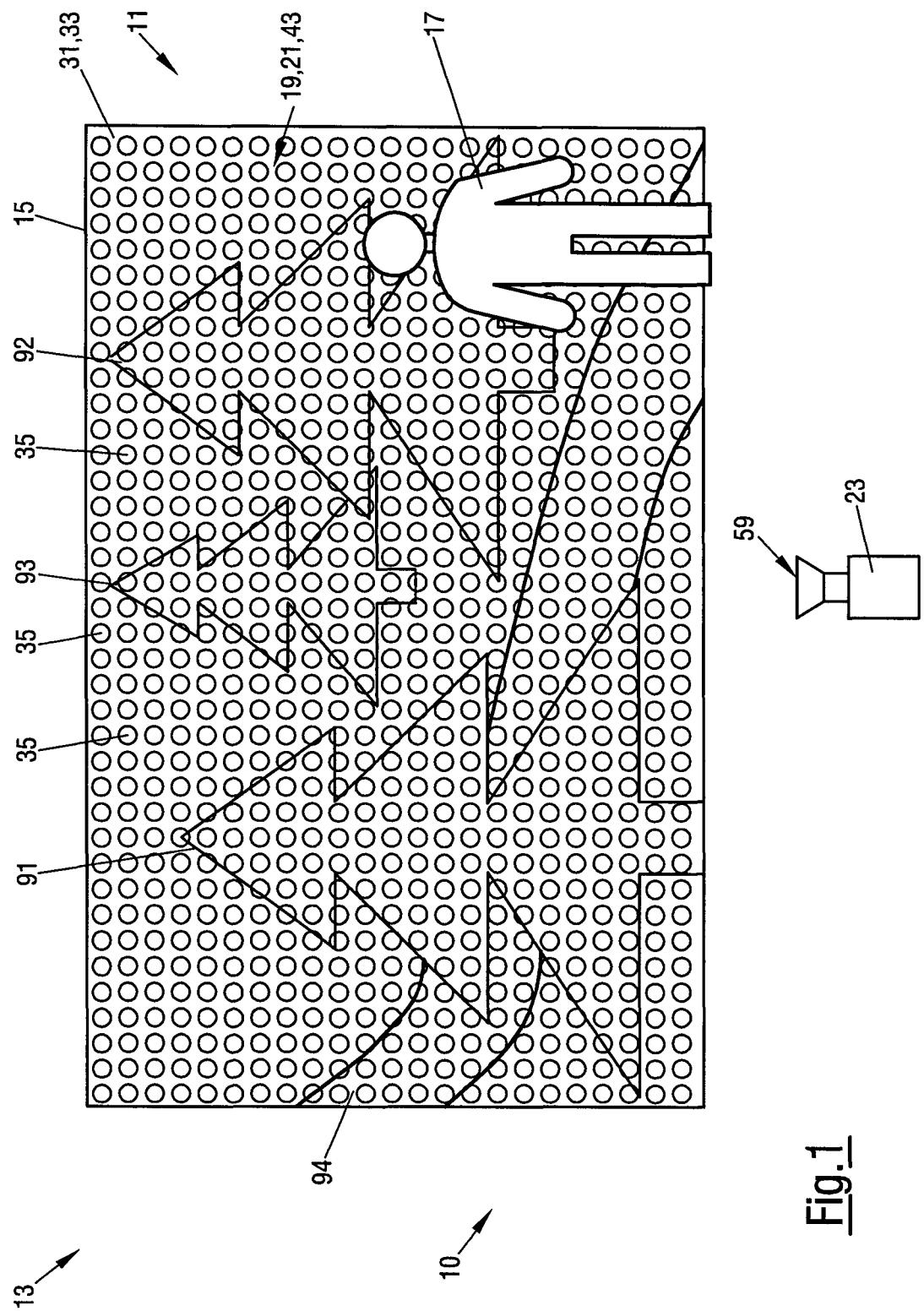

(51) Int. Cl.
| | |
|---|---|
| *G06F 3/147* | (2006.01) |
| *G06T 5/00* | (2006.01) |
| *G06T 15/10* | (2011.01) |
| *H04N 23/71* | (2023.01) |
| *G03B 15/10* | (2021.01) |
| *G09F 9/33* | (2006.01) |

(52) U.S. Cl.
CPC ............. *G06T 5/00* (2013.01); *G06T 15/10* (2013.01); *H04N 5/2228* (2013.01); *H04N 23/71* (2023.01); *G03B 15/10* (2013.01); *G09F 9/33* (2013.01)

(58) Field of Classification Search
CPC .... G06F 3/147; H04N 5/2224; H04N 5/2226; H04N 5/2228; H04N 5/2351; H04N 5/2621; H04N 5/2628; H04N 5/272; H04N 9/3141; H04N 5/208; G06T 5/00; G06T 15/10; G03B 15/10; G09F 9/33
See application file for complete search history.

(56) References Cited

U.S. PATENT DOCUMENTS

| | | |
|---|---|---|
| 9,087,401 B1 | 7/2015 | Zheng et al. |
| 11,350,059 B1 | 5/2022 | Swierk et al. |
| 11,443,560 B1 | 9/2022 | Wright |
| 11,457,187 B1 | 9/2022 | Zink et al. |
| 11,475,615 B1 | 10/2022 | Springer et al. |
| 11,665,307 B2 * | 5/2023 | Koppetz ............... G06T 5/00 396/3 |
| 11,756,279 B1 | 9/2023 | Cordes et al. |
| 11,991,483 B2 * | 5/2024 | Popp .................. G09G 3/32 |
| 12,022,243 B2 * | 6/2024 | Popp .................. H04N 9/3155 |
| 12,075,182 B2 * | 8/2024 | Ukas-Bradley ........ H04N 5/265 |
| 2005/0168485 A1 | 8/2005 | Nattress |
| 2020/0145644 A1 | 5/2020 | Cordes et al. |
| 2021/0150804 A1 | 5/2021 | Wick et al. |
| 2022/0353473 A1 | 11/2022 | Springer |
| 2022/0353474 A1 | 11/2022 | Springer et al. |

FOREIGN PATENT DOCUMENTS

| | | |
|---|---|---|
| DE | 695 06 856 T2 | 7/1999 |
| DE | 10 2005 005 795 A1 | 8/2006 |
| DE | 20 2014 005 837 U1 | 10/2014 |
| DE | 10 2017 208 526 A1 | 11/2018 |
| DE | 10 2018 118 187 A1 | 1/2020 |
| WO | 2014/206394 A9 | 12/2014 |

OTHER PUBLICATIONS

European Search Report dated Nov. 25, 2021 in related European Patent Application No. 21186954.0 (six pages).
Notice of Allowance dated Feb. 1, 2023 in related U.S. Appl. No. 17/382,214, filed Jul. 21, 2021 (21 pages).
Communication under Article 94(3) EPC dated Jul. 19, 2023 in related European application No. 21 186 954.0 (nine pages).

* cited by examiner

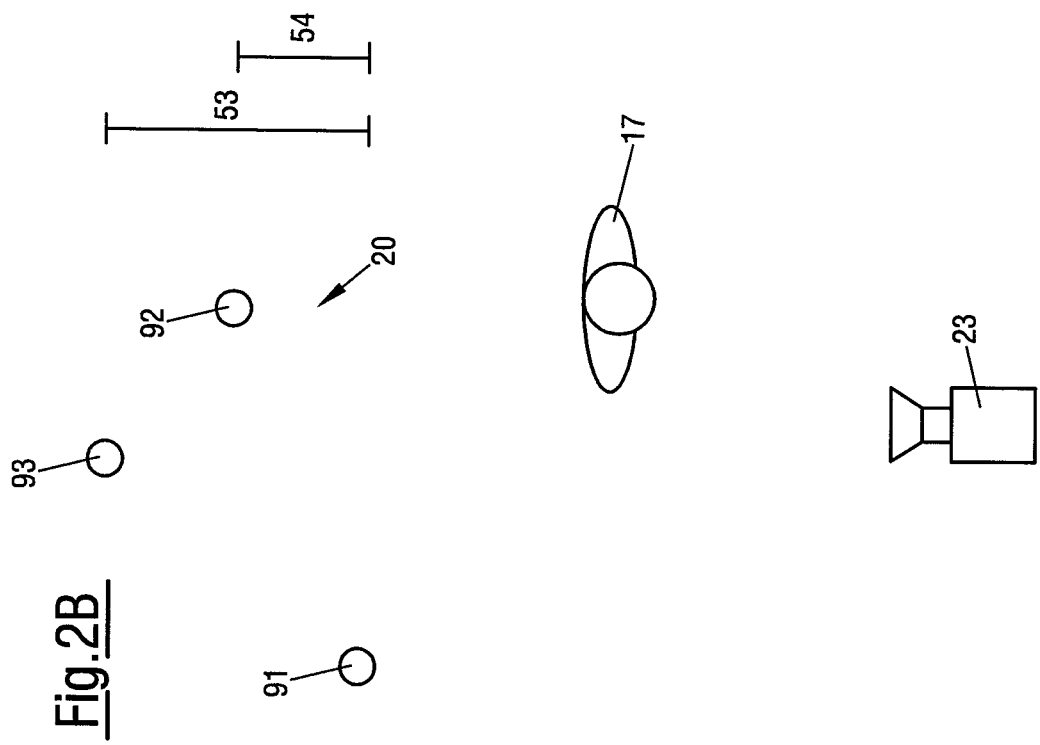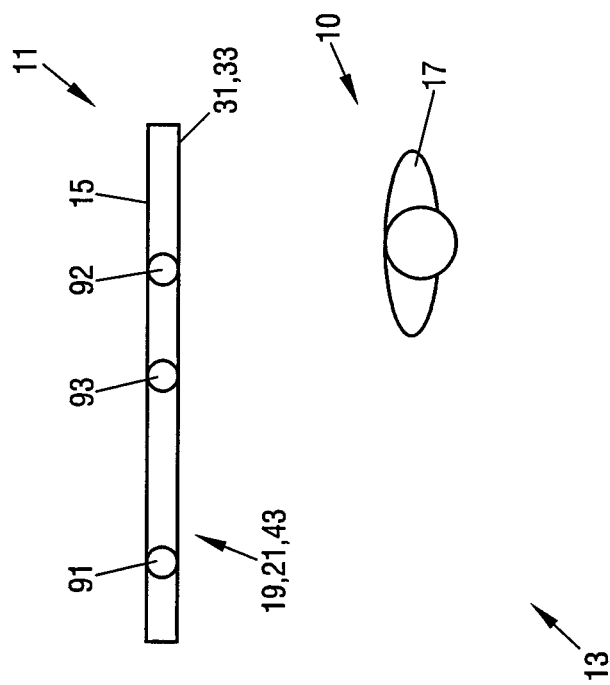

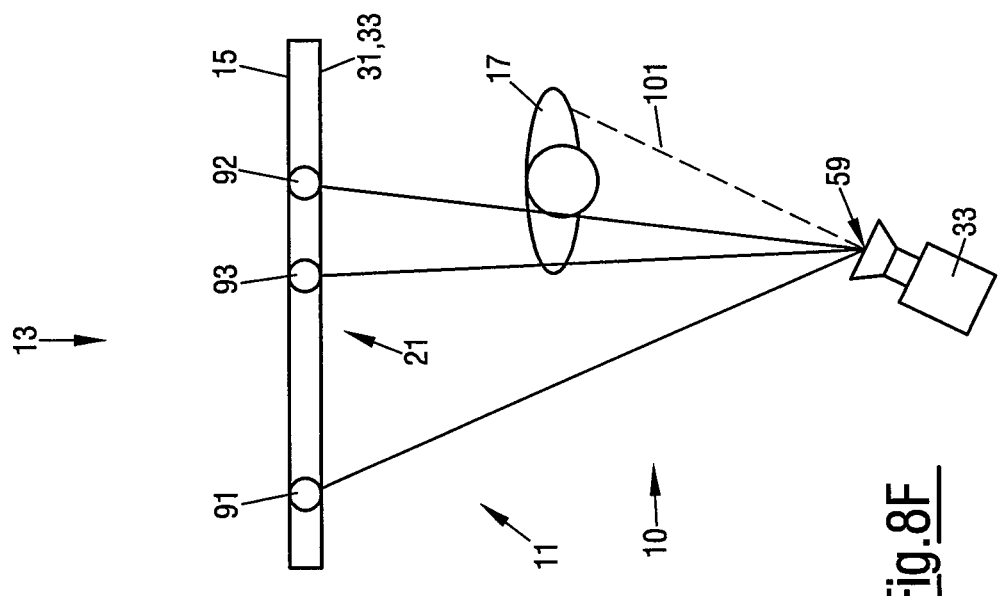
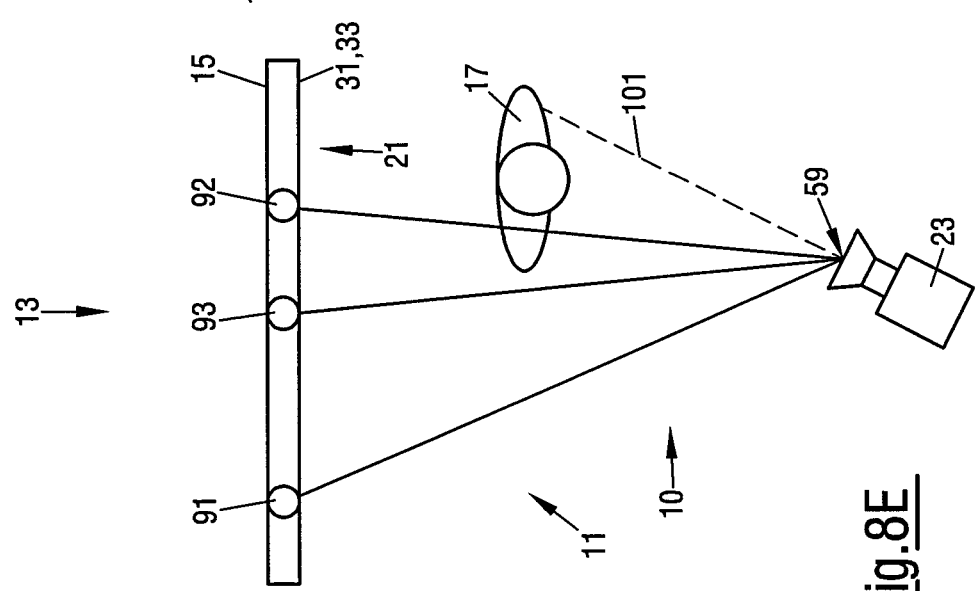

BACKGROUND DISPLAY SYSTEM

CROSS-REFERENCES TO RELATED APPLICATIONS

This application is a continuation of U.S. application of Ser. No. 17/382,214, filed Jul. 21, 2021, which claims priority to German patent application no. 10 2020 119 601.6, filed Jul. 24, 2020, the contents of which are hereby incorporated by reference in their entireties.

BACKGROUND OF THE INVENTION

The invention relates to a background display system for a virtual image recording studio having a background display device which is configured to display a representation of a virtual background behind or above a real physical subject for a recording by means of an associated camera.

For example, such a background display system having a background display device can be provided to produce in an image recording studio a virtual background or a virtual environment, before which or in which, a scene to be recorded by means of a camera takes place or a recording can take place. The image recording studio can involve a film studio for recording moving images or a photo studio for recording individual images or still pictures. For this purpose, in particular a three-dimensional background, for example, a landscape or a space, can be displayed on an essentially two-dimensional plane, and an actor can move or position himself or herself as a physically real subject in front of such a background display device such that in the image recording studio almost any number of spaces or landscapes can be re-enacted. Therefore, adding such a background later or separately as in a recording before a Green-Screen, is no longer necessary.

The recording of moving image scenes with such a background display device can furthermore facilitate actors to react to events or movements taking place in the background of the subsequent film, since such animation can be represented by means of the background display device and can be directly noticed by the actors. Unlike, for example, with a Green-Screen where the environment is not visible for the actor, the actor can thus experience the background proceedings and adapt to the drama.

Such a background display device thus offers the possibility of representing a virtual background for a scene to be recorded which is animated and easily adaptable and therefore facilitates, in particular, with the acting or the gestures. However, a problem arises in the interaction with the associated camera in that the adjustments performed to the camera are based on the mostly occurring representation of a three-dimensional virtual background in two dimensions, which affects differently the image produced by the camera as would be expected by a recording of an actual three-dimensional scene in a three-dimensional environment. In particular, depth-dependent characteristics of the lens connected with the camera can thereby get lost in the image of the representation of the virtual background such that, the image of the representation of the virtual background can deviate from an image of a real background corresponding to the virtual background.

Through the choice of qualified and desired depth-dependent effects of the camera lens, especially in view of a bokeh to be generated in the image of the virtual background generated by the camera, can therefore not be realised. The bokeh depicts in particular, the quality of the blurred regions in the image produced by the camera, which is produced by the projection of the incoming light rays onto an image plane and, for example, onto an image sensor disposed there by means of the lens used. For example, the shape of the blurred region as a circle or disc can be determined by the bokeh, whereby these shapes or their sizes can depend, on the one hand, on the distance from the recorded object to the camera, and on the other hand, on the characteristics of the lens used. Since the blurred regions can co-determine the impression of the image produced by the camera, a lens used for a recording can often be chosen just by consideration of the bokeh produced by this lens, whereby the desired bokeh for a recording of the representation of the virtual background often cannot be attained.

It is therefore the object of the invention to achieve a background display system which makes it possible to achieve camera effects and/or lens-specific effects in an image of a representation of a virtual background produced by means of an associated camera, and in particular, such effects which would be created by an image of a real background corresponding to the virtual background.

This object is achieved by a background display system including the features of claim 1.

The background display system comprises a control device which is configured to control the background display device, wherein the control device comprises a data input for receiving lens data from the associated camera, and wherein the control device is configured to adjust the representation of the virtual background dependence of the received lens data.

Since the control device comprises a data input for receiving lens data of the associated camera, camera or lens-specific parameters or settings of the camera for a representation of the virtual background can be considered, so that by adjusting the representation of the virtual background, the optical image of this representation produced or producible by means of the camera can be influenced. The camera, which is intended for recording a scene or an image, can for this purpose be connected to or be connectable with the data input of the control device, and the control device can be configured to receive the lens data wirelessly and/or by a cable from the camera. Accordingly, the camera can also be designed for wireless and/or wired transmission of the lens data.

To represent the virtual background, the background display device can constitute, for example, an electronic display with an active pixel matrix and, in particular, can comprise an active illumination apparatus having a plurality of light sources, in particular an LED wall with a plurality of light-emitting diodes or an OLED wall with a plurality of light-emitting diodes which can be controlled individually and/or in groups of adjacent lighting means or arrays of lighting means. As a result, a virtual background, which, in particular, can display a three-dimensional scene, can be represented pictorially by appropriate control of the lighting means on the background display device. Furthermore, the background display device can be configured to generate the representation of the virtual background by means of a rear projection, for which purpose the background display device can comprise, in particular, a partially transparent screen and a projector, in particular, a DLP (digital light processing) projector.

The virtual background can be displayed by the background display device, in particular, as a mathematical projection onto an essentially and/or at least partially two-dimensional surface, wherein the background display device can be designed at least partially flat or planar and/or at least partially arched or curved. For example, the background display device or a part of the same intended for displaying the representation of the virtual background, as a background in front of a real subject to be recorded can extend vertically upwards and in an upper section thereof the subject to be recorded is projected arched, in order to be able to present the most complete background possible.

In that, the control device is configured to adjust the representation of the virtual background dependent on the received lens data, in particular based on the respective settings of lens parameters or other values that characterize the camera lens used, the effects arising in a theoretical image of a real background, in particular three-dimensional, corresponding to a virtual background can be reproduced in the actual generated image of the representation of the virtual background. For this purpose, the lens data can comprise in particular the lens setting values. Such lens setting values can represent values of variable parameters that can be set for the camera lens. For example, a diaphragm aperture, a focal length and/or a focus value can influence the images generated by means of the camera, so that values of these parameters can be transmitted to the control device as lens data and can be considered when adjusting the representation. Furthermore, the lens data can comprise information on the lens used, which can be designed, in particular, as an interchangeable lens. Also, such information about the lens used, for example, a lens type and/or a serial number, can in addition be used to adjust the representation, in order to be able to reproduce, for example, lens-specific effects, in particular shapes of blurred regions, in the optical image of the representation of the virtual background generated by the camera. In this respect, the lens data can also be referred to as camera lens data.

The control device can be designed, for example, as a microprocessor, a CPU (Central Processing Unit) or a GPU (Graphics Processing Unit), which is configured to process the received lens data and to generate appropriate commands for adjusting the representation of the virtual background. The control device can have an integrated memory or be connected to a memory, for example, in order to be able to store and access image information and position information of the virtual background.

Furthermore, it can be provided for, that the control device comprises a game-engine or is configured to use a game-engine in order to generate the representation of the virtual background. A game-engine can be realised basically as a software in order to generate a representation of an environment, in particular in a computer game taking into account a position, in particular a position of a player. In doing so, the game-engine can access one or more data bases in order to generate the respective environment. Correspondingly, such a game-engine can be used to generate the representation of the virtual background taking into consideration the position of the real subject, in particular an actor, and/or the camera. The representation generated by the game-engine can then be adjusted dependent on the received lens data in order that the optical image generated by the camera approximates a theoretical image of a real background corresponding to the virtual background. Such a game-engine can run, for example, on a microprocessor (in particular, also a multi-core) or a graphics card.

For example, the control device can be configured to select from a databank, depending on the received lens data and in particular received information about the lens used or a lens type, a digital filter assigned to the lens and to apply this filter in order to adjust the representation of the virtual background. Furthermore, received lens setting values, for example a focal length or a focusing distance, can be used as parameters in such a digital filter, in order to take into account the setting of the respective lens in the representation of the virtual background. The use of digital filters for adjusting the representation of the virtual background can, for example, also occur by means of a game-engine so long as this is intended for generating the representation of the virtual background. However, it is also possible that such an intended game-engine is provided for only generating the representation without taking into consideration the lens data, while the representation is adjusted by further software modules that do not form part of the game-engine. In addition, the representation can also be generated in other ways, for example by means of models stored in a databank and/or a memory, without the control device comprising of a game-engine.

Settings for the parameters of a lens of the associated camera or for the camera can, for example, influence the sharpness of a point or object in an optical image generated by means of the camera. The sharpness with which a respective point or object appears in the image can depend on the distance of the object in question from the camera or its lens, so that objects in a real background corresponding to the virtual background arranged spaced to each other or with different spacing to the camera, would be represented in a theoretical image of this real background with varying sharpness. However, since these objects can be represented by means of the background display device in a plane or at least with a distance to the camera different from the distance of the object in the real background, the objects in the optical image of the representation of the virtual background generated by the camera are imaged mostly having a substantially equal sharpness determined by the distance of the background display device to the camera. The receiving of lens data in particular of lens setting values, allows, for example, the adjusting of the sharpness of the objects already in the representation of the virtual background so as to be able to reach in the optical image of the representation of the virtual background ultimately the same or similar blur as in an image of the real background. By adjusting the representation for all regions of the background display device, in particular a distribution of sharpness comparable with the theoretical image and a comparable bokeh can also be generated.

The adjustment of the representation can thus effectively serve to influence and in particular intensify the effects on the optical image of the representation of the virtual background impacted by the associated camera dependent on the lens data and in particular lens adjustment values. Due to the deviation of the geometric conditions of the representation of the virtual background from the conditions in a real background corresponding to the virtual background, the absence of effects or the dampening of such effects can therefore be compensated for. In particular, the deliberate blurred representation of an object or point in the representation of the virtual background can lead to a sharpness or blur of this object or point, caused by the setting of the lens, in the optical image generated by the camera being intensified in such a way that the blur corresponds to or approximates a blur in a theoretical image of a real background corresponding to the virtual background.

In order to adjust the representation of the virtual background, it is not necessary that a complete representation of the virtual background has been generated by the background display device before the receiving of lens data or before adjusting the representation. Rather, the adjusting of the representation dependent on the received lens data can, for example, also take place at the beginning of a scene or before a recording when generating the representation, wherein the lens data can be received and the representation in dependence thereof can be generated. Thus, the adjusting of the representation can in principle also take place, or be understood as such, as an integral process during the generation of the representation by means of the background display device. To generate and adjust the representation, the control device can, for example, draw on a model, in particular a three-dimensional model, which can be stored and made available in a non-volatile memory, for example a semiconductor memory. In particular, the control device can draw on a respective model in dependence of the received information about the lens used. Alternatively, or in addition, the control device can draw on a game-engine to generate the representation.

Lens data can be transmitted to the control device or received from the control device in real time, for example while a film scene is being recorded, so that the representation can be adjusted, for example, in real time to the changing settings of the lens or camera. For example, the representation of the virtual background can be continuously adjusted while focusing on a real subject, for example an actor's face, located in front of the background display device, in order to be able to obtain a bokeh in the optical image of the representation of the virtual background generated by the camera which is as close as possible to that expected by a recording of a real background corresponding to the virtual background.

Furthermore, it can also be provided for, that positions and/or orientations, for example inclinations or angles, of the lens or of the camera are transmitted to the control device and the control device adjusts the representation of the virtual background dependent on such position data. Movements of the camera can also affect differently the generated image of the representation of the virtual background and a theoretical image when recording a real background corresponding to the virtual background, wherein the control device can, for example, be configured to shift objects of the virtual background depending on the received position data in order to bring their positions in the generated image closer to the expected positions in the theoretical image.

As already explained, the background display device can, in particular, be intended to provide a virtual background for a recording of a film scene that is filmed or is to be filmed in the virtual image recording studio. However, it is also possible by means of the background display device to generate a virtual background for a photo shoot, for example in fashion photography, wherein the representation of the virtual background for the photo or still image to be recorded can be adjusted depending on the received lens data. This can make it possible to achieve a realistic bokeh in the optical image of the representation of the virtual background generated by the camera, which is especially aimed at in photography and is conditioned by the choice of lens.

Further embodiments of the invention can be taken from the dependent claims, the description and the drawings.

In some embodiments, the background display device can comprise a planar active illumination apparatus. In particular, the background display device can comprise an active two-dimensional illumination apparatus, in particular an active pixel matrix. The illumination apparatus can comprise a plurality of lighting means which can be controlled individually and/or in respective groups by the control device in order to be able to generate an image or a representation and to be able to display a virtual background for a recording scene. The lighting means is adjustable in particular with regard to the colour and/or brightness of the light produced, so that by controlling the lighting means, the representation of the virtual background can be actively generated or adapted. As well, the entirety of the lighting means can show a displayed representation of, in particular, the three-dimensional virtual background on, in particular, the two-dimensional surface of the active illumination apparatus. Movements in the virtual background can also be reproduced by adjusting the representation or by a corresponding controlling of the illumination apparatus. As an alternative to an active illumination apparatus with a plurality of lighting means, it can also be provided for, that the background display device is configured to generate the representation of the virtual background by means of a rear projection.

In some embodiments, the background display device can be configured to illuminate the real subject. In particular, in addition to generating the representation of the virtual background, the background display device can thus be configured to illuminate the real subject, for example an actor, and operate in addition to other lighting of the virtual image recording studio. In particular, the background display device can extend behind or above the real subject, so that the background display device can be configured to illuminate the real subject from the side and/or from above.

Such an illumination of the real subject by means of the background display device makes it possible, for example, to create and record true to detail, effects generated by light sources in a real background corresponding to the virtual background, in particular, when interacting with the real subject. For example, light sources present in the virtual background, such as streetlights or headlights of a passing car in a street scene to be recorded, can directly illuminate an actor, so that the shadow cast by the actor corresponds to the shadow that the actor would cast when illuminated by a real streetlight or a real spotlight.

In some embodiments, the background display device can comprise an LED comprising a plurality of individually controllable light-emitting diodes (LED) in a two-dimensional arrangement. In particular, the background display device can be designed as an LED wall with a plurality of light-emitting diodes, wherein the light-emitting diodes can be controlled individually or in groups, in order to generate a representation of a virtual background in an area. By controlling these light-emitting diodes, the display can be adapted by means of the control device, in order to be able to change the virtual background and/or to be able to influence an optical image of the representation of the virtual background, that is generated or can be generated by the camera. Furthermore, the background display device can comprise an OLED wall having a plurality of organic light-emitting diodes (OLED) and/or be designed as an OLED wall.

It can be provided for in some embodiments, that the background display device extends in a vertical and/or horizontal orientation. In particular, the background display device can as well extend planar in a vertical and/or horizontal plane or in a curved manner. For example, the background display device can comprise an illumination apparatus, in particular an LED wall, which can extend vertically surrounding a real subject, in order to represent the virtual background in such a way that when the camera is pivoted, the virtual background is also recorded. It is also possible for the background display device to extend in a vertical plane, in order to represent the virtual background in this plane and in particular behind the real subject. Furthermore, the illumination apparatus or the LED wall can, for example, extend in a horizontal plane above the real subject, in order to form or complete the virtual background and/or the illumination of the subject, in this plane or above the subject. In this case, an arched or curved transition can be provided between a vertical and a horizontal section of the background display device. Furthermore, it can be provided for, that the background display device extends, at least in sections, inclined upwards above the real subject.

In some embodiments, the control device can be configured to adjust the representation of the virtual background in such a way that an optical image of the representation generated by the camera in accordance with the received lens data approximates a theoretical image that would be generated if a real background corresponding to the virtual background was imaged by means of the assigned camera.

In particular, by means of the background display device, a virtual background can be represented which displays a three-dimensional environment for the scene to be recorded. This can therefore deal with, for example, an imitation of a real existing landscape or a real existing space, or fictitious environments can be created. However, a real background that in reality is three-dimensional, and where applicable also in a fictitious reality, can mostly be displayed by the background display device in a projection, in particular in two dimensions, so that in reality, objects or regions of the virtual background that are distant from one another or could be objectionable, are represented on one plane or at least with a distance to each other that deviates from reality. Accordingly, all objects of the virtual background are also recorded by the camera at a distance from the camera that is essentially the same or at least does not correspond to the real distance to the camera.

The representation of the virtual background in reality would in particular be a three-dimensional background, by means of the background display device can thus lead to the fact that depth-dependent properties of the lens get lost in an optical image generated by means of the camera. For example, the sharpness of the different regions of the real background in a theoretical image, which the camera would produce when imaging the real background due to its three-dimensionality, depends on the distance between these regions and the camera and, in particular, can change dependent on the lens data or lens setting values, for example, a diaphragm aperture. In order to be able to achieve such effects in the optical image produced or producible by means of the camera, even when recording a scene before the representation of the virtual background, the representation can be adjusted, for example, so as to increase the region of blur in the optical image generated by the camera caused already by a blurred representation. In particular, such a blurring can be generated by combining a number of lighting means of an active illumination apparatus, in particular, a plurality of light emitting diodes to form an area with the same and/or similar colour and/or brightness.

For example, the control device can be configured to calculate a theoretical image, i.e. an image of a real background corresponding to a virtual background, in dependence of the received lens data, in order to be able to compare the optical image that can be generated by the camera with this lens data, with the theoretical image. For this purpose, the control device can, for example, draw on a model of the virtual background, which, in particular, can comprise position data for a plurality of (virtual) background regions, from which the distances between these background regions of the virtual background to the (real) background display device onto which the virtual background is displayed, and/or to the camera can be derived. This position data can, in particular, also take into account a curvature of the (real) background display device in a space. The control device can also be configured to calculate the actual producible image of the representation of the virtual background dependent on the lens data in order to be able to compare this image with the theoretical image, for example, using image analysis methods, and to be able to adapt the representation of the virtual background so that the optical image can approximate the theoretical image.

Furthermore, it can be provided for, that the control device can access a memory (local or cloud) in which a number of models for generating the representation of the virtual background dependent on the received lens data are stored. These can be obtained beforehand, for example, by simulations or, in particular, when reproducing actual landscapes, experimentally taking pictures of the landscape with different lens setting values, which can be received as lens data by the control device. The control device can thereby be configured to use the respective corresponding model to generate the representation of the virtual background in dependence of the received lens data, in particular lens setting values, and to adjust the representation by changing the model used.

Furthermore, respective models for certain lens types and/or respective lenses can also be stored in the memory, so that after receiving information about the lens used or lens data comprising such information, the control device can use a respective assigned model to generate the representation. For example, the received lens data can comprise a lens type and/or a serial number or some other identification of the lens. In particular, a form of blurred regions in an image of a real background corresponding to the virtual background, which can depend on the lens used, can thereby be reproduced in the optical image of the representation of the virtual background actually generated by the camera. In addition to such information about the lens used, the lens data can also comprise respective lens setting values, so that a representation related to the respective lens and adapted to the settings of this lens can be generated.

In some embodiments, the lens data can represent parameters that are set in a lens of the associated camera.

The lens data can represent set values (lens setting values) of at least one of the following lens parameters of the associated camera: a diaphragm aperture, a focusing distance and/or a focal length of a lens of the associated camera. The diaphragm aperture can in particular relate to an opening width of an iris diaphragm of the lens. In particular, settings of these parameters, depending on the distance between an object and the camera, can affect the sharpness with which the object is imaged in the image generated by the camera, so that the representation of the virtual background, taking into account the values of one or more of these parameters, can be adjusted in order to obtain the most realistic bokeh possible.

In some embodiments, it can be provided for, that the control device is configured to receive position data from the associated camera at the data input and to adjust the representation of the virtual background depending on the received position data. For example, such position data can comprise distances or inclinations or angles of the camera or lens relative to the background display device. In order to be able to obtain such position data, the background display system can, for example, comprise a position determining device with auxiliary cameras, which can optically detect the position of the camera intended for recording the scene relative to the background display device and can transmit it to the control device.

Also, by taking into account such position data or orientations of the camera when adjusting the representation, an optical image of the representation of the virtual background generated by means of the camera can approximate a theoretical image that would result from a recording of a real background corresponding to the virtual background. For example, when the camera is pivoted, angles to objects displayed by means of the background display device can change differently than would be the case with objects in a real background in which the objects show different distances to the camera. The control device can, for example, be configured to determine such deviations in the representation of the virtual background and to move the objects on the background display device in such a way, that the objects in the optical image generated by means of the camera have an angle corresponding to the angle in the theoretical image or a distance to neighbouring objects are imaged.

In some embodiments, the lens data can comprise information about a lens used by the associated camera, wherein the control device can be configured to adjust the representation of the virtual background depending on the received information about the lens used. In particular, the lens can be designed as an interchangeable lens, so that a respective interchangeable lens optimally adapted to the recording to be carried out, can be connected to the camera. Depending on the lens used, lens-specific effects can arise that can have different effects on the optical image of the representation of the virtual background generated by the camera and on a theoretical image that would be generated by the camera when imaging a real background corresponding to the virtual background. In principle, however, cameras with respective permanently assigned lenses can also be provided, so that by transmitting the information, the lens assigned to the respective camera can be registered and can be taken into account when adjusting the representation of the virtual background.

Such information about the lens used can, in particular, comprise the lens type or model. The representation of the virtual background can be adjusted in such a way that optical effects caused by the lens type, which would arise in a theoretical imaging of the real background, are imitated in the optical image of the representation of the virtual background generated by the camera. In particular, optical aberrations, in particular distance-dependent optical aberrations, of the lens can be amplified or influenced by adjusting the representation of the virtual background in such a way that these optical aberrations are reflected in an optical image of the representation of the virtual background in the same or approximately the same way as in an image of a real background corresponding to the virtual background. In particular, the control device can access digital filters for this purpose, which correlate with the lens used in order to determine the necessary adjustment of the representation of the virtual background. For example, the control device can be configured to use such digital filters when calculating the theoretical and/or the actual generated image in order to be able to determine a necessary adjustment of the representation of the virtual background.

In some embodiments, the information can represent a lens type, an identification of the lens, a shape of an iris diaphragm of the lens (e.g., number of blades or lamellae), an arrangement of cylindrical elements of the lens (in particular, in the case of an anamorphic lens) and/or a coating of an optical element of the lens. In particular, an identification of the lens can comprise a serial number in order to enable an unambiguous determination of the lens used. It can be provided for, that based on the serial number, the relevant data is read out from a stored databank (local or cloud). In principle, however, only properties of the lens such as the shape of an iris diaphragm or the arrangement of optical elements of the lens can be used to adjust the representation of the virtual background, without directly considering the lens type.

In some embodiments, the control device can be configured to adjust the representation of the virtual background in such a way that distance-dependent imaging effects that would arise in a theoretical image, generated by means of the associated camera in accordance with the received lens data, of a real background corresponding to the virtual background are reproduced in the optical image of the representation of the virtual background generated by the camera.

In particular, the sharpness with which objects are imaged in the optical image that can be generated by means of the associated camera, can be distance-dependent and depend on the lens data or lens setting values, for example a diaphragm aperture. For example, in reality objects that are far away can be imaged blurred with a wide aperture, while closer objects can be imaged in focus. On the other hand, by reducing the diaphragm aperture, objects that are further away can also be increasingly displayed in focus.

Due to this dependency of the sharpness of an object in the optical image on a distance between the object and the camera, differences can occur in an optical image of the representation of the virtual background that can be generated by means of the camera compared to a theoretical image, which would arise in a recording or imaging of a real background. In order to recreate this distance-dependent imaging effect in the optical image that can be generated by the camera, a faraway point in the real background can be displayed blurred in the representation of the virtual background dependent on the received lens data, in order to display this point in the optical image of the representation of the virtual background generated by the camera with a blur corresponding to or approximating the blurring in a theoretical image of the real background. Likewise, for example, brightness values of individual points or regions of the representation of the virtual background can be adjusted dependent on the received lens data, in order to recreate a distance-dependent change in brightness in a theoretical image of the real background that can be generated by means of the camera, for example, by a change in a diaphragm aperture in the optical image of the representation of the virtual background generated by the camera.

In some embodiments, the virtual background can represent a three-dimensional scene and the control device can be configured to represent different regions of the three-dimensional scene with different sharpness depending on the received lens data. Since different regions of the three-dimensional scene can be represented with different degrees of sharpness, in particular, a blur gradient can be achieved in the optical image of the representation of the virtual background by means of the camera, which corresponds or approximates a blur gradient in a theoretical image of a real background corresponding to the virtual background. For this purpose, for example, a model of the virtual background can be represented or rendered in sections with different sharpness by means of the background display device. Different regions of the three-dimensional scene can, for example, be divided into different distance regions in relation to the camera or the background display device or into different sharpness regions, whereby the distance regions or sharpness regions for different lens data can be assigned different sharpness or blurriness, with which the virtual background is to be displayed in the representation by means of the background display device. In this way, for example, a distance-dependent blur gradient or a bokeh in the optical image generated by the camera can be approximated to a blur gradient in a theoretical image that would be generated by the camera when imaging the real background or the real three-dimensional scene.

In some embodiments, as already mentioned, the control device can be connected to a memory in which the virtual background is stored as a model, wherein the control device can be configured to generate the representation of the virtual background based on the stored model. For example, a model of the background can be stored in the memory, in particular, a semiconductor memory, according to which all objects of the virtual background are sharply represented by the background display device, and the control device can be configured to adapt this model dependent the received lens data, in order to take into account, for example, a changing aperture, and to be able to represent objects more blurred when the diaphragm is opened. Furthermore, the memory can provide, for example, various models of the virtual background, which can be assigned to the respective lens data, for example, a respective lens type or respective lens setting values of the lens, so that the control device can access a respective model dependent on the received lens data and can represent the model by means of the background display device. For example, respective models can be stored for different diaphragm apertures, focal lengths and/or focusing distances or combinations of these parameters.

In general, said memory does not have to be arranged locally on the control device. It can also be a storage device accessible via a data network (wired or wireless) (e.g., databank in cloud storage).

The stored model of the virtual background can comprise respective image information and respective position information for a plurality of background regions. The image information can comprise, for example, colour and/or brightness information of a respective background region, while the position information can comprise, for example, distances between the background regions and the background display device and/or three-dimensional coordinates of the respective background region, in particular, with respect to one defined origin in the image recording studio or to the background display device. A background region can be formed or displayed, for example, by a single lighting device of an illumination apparatus of the background display device or by a light-emitting diode of an LED wall, while it is also possible for several of such lighting devices to be combined in a common background area. The control device can be configured to adjust or set each of the plurality of background regions individually dependent on the received lens data.

In some embodiments, the position information can comprise distances of the background regions from the background display device, wherein the control device can be configured to read out the stored distances and to take them into account when adjusting the representation of the virtual background. The distances can indicate the distance at which a respective region of a real background corresponding to the virtual background would be from the background display device. For example, objects arranged in the virtual background can be assigned to respective background regions.

For example, the control device can be configured to determine, at least approximately, distances from the background regions to the camera, from the distances from the background regions to the background display device included in the position information, or to assign to the background regions respective distances to the camera. If a setting is now made to the lens of the camera and a corresponding lens setting value, for example, a diaphragm aperture, is transmitted to the control device, the control device can be configured to determine, based on the distance between the background region and the camera and the received lens data, how the setting of the lens is reflected in a theoretical image of a real background corresponding to the virtual background, in which the background region exhibits the previously determined distance to the camera. Furthermore, the control device can be configured to determine what effect the setting of the lens has on the actual image of the representation of the virtual background generated by the camera, in which the distance from the background regions to the camera corresponds to the distance from the camera to the section of the background display device in which the background region is represented. By comparing the effects in the theoretical image of the real background and in the actual image of the representation of the virtual background generated by the camera, the necessary adjustments to the representation can then be performed in such a way that the background region in the optical image of the representation of the virtual background is imaged by means of the camera in the same or similar way as in the theoretical image when imaging the real background.

Furthermore, in some embodiments, the control device can be configured to generate the representation of the virtual background based on the image information stored for the plurality of background regions and to adjust the representation dependent on the position information stored for the plurality of background regions and on the received lens data. The image information can determine a basic model or the representation of the virtual background which, for example, assigns a colour and/or a brightness for each of a plurality of light sources, in particular, light-emitting diodes, an illumination apparatus or an LED wall of the background display device or arrays of such light sources. In particular, the image information can be provided for to generate a completely sharp representation of the virtual background which can be adjusted dependent on the received lens data. It can be provided for that the control device is configured to use a game-engine to generate the representation.

In order to be able to reproduce in particular distance-dependent imaging effects that depend on the received lens data by adjusting the representation in an optical image generated by the camera, the stored position information assigned to the plurality of background regions can be used. For example, based on the position information, distances between the background regions and the camera can be determined or assigned in order to determine how and in particular with what sharpness or blurring the background regions would be imaged in a theoretical image of a real background. This makes it possible to represent certain background regions depending on their position and the received lens data, for example, as already blurred by means of the background display device, so that in the optical image of the representation of the virtual background a blurring can be achieved that corresponds to the blurring in a theoretical image of the real background.

It can be provided for, that setting instructions for the background display device dependent on the received lens data are stored in the memory, wherein the control device can be configured to control the background display device based on the setting instructions for adjusting the representation of the virtual background. For example, different models can be stored in the memory, based on which the representation of the virtual background can be generated. The models can, for example, be assigned to respective lens data in a look-up table so that the control device can determine the model suitable for the received lens data from the look-up table and can use it to adjust the representation of the virtual background. In particular, setting instructions for each lighting means or for respective groups of lighting means of an illumination apparatus of the background display device, in particular, an LED wall, can be stored.

When assigning setting instructions to lens data which comprise at least one lens setting value, it can be provided for, that the control device is configured to interpolate between two setting instructions when the received lens setting value lies between two values, for which, setting instructions are stored in the memory. As an alternative to this, the control device can be configured to use approximately the setting instructions for an adjacent lens setting value.

In some embodiments, the control device can have a calculation device which is configured to determine for a plurality of background regions, image parameters of a theoretical image that would be generated if a real background corresponding to the virtual background was imaged by means of the associated camera according to the received lens data, and image parameters of an optical image of the representation of the virtual background that can be generated by means of the associated camera in accordance with the received lens data, wherein the control device can be configured to adjust the representation of the virtual background on the background display device in such a way that the image parameters of the optical image approximate the image parameters of the theoretical image. In particular, the calculation device can be configured to calculate the imaging parameters for the plurality of background regions, which can be stored in the aforementioned memory for the model of the virtual background. The calculation device can be provided, for example, as a microprocessor and/or a CPU and/or a GPU or a part thereof, which is configured to carry out software-based calculation steps or queries. In principle, the control device and the calculation device can be combined in a common unit, while it is also possible that the calculation device is designed as a separate component which is connected to the control device.

For example, the calculation device can access position information that is assigned to the respective background regions and based on this position information, can calculate an imaging parameter of the theoretical image for the respective background region dependent on the received lens data. Such an imaging parameter can, for example, be a measure of blurring, for example, a diameter of circles of confusion that arise in the image, or a measure of a brightness with which a respective background region is imaged in the image. Such imaging parameters can, in particular, depend both on the lens data or the lens setting values representing the settings of the lens, for example, a focal length, a focusing distance and/or a diaphragm aperture of the lens of the associated camera, and on the distance from the background regions to the camera, so that the imaging parameters in the theoretical image of the real background and the imaging parameters in the actually generated image of the representation of the virtual background displayed by the background display device, can be distinguished from one another. The calculation device can accordingly be configured to calculate the respective imaging parameters for the imaging of the representation of the virtual background, in particular, taking into account the distance from the background display device to the associated camera.

The calculation device and/or the control device can be configured to compare with one another the imaging parameters calculated for the theoretical image and for the optical image actually generated by the camera. Based on such a comparison, the control device can be configured to adjust the representation of the virtual background or the background region on the background display device in such a way that the imaging parameters approximate one another. Thereby, for example, a relationship between the calculated diameters of circles of confusion can be formed for which a respective point is imaged in a background region in the optical image of the representation of the virtual background that can be generated by means of the camera and in the theoretical image of the real background, and a number of light sources of the background display device, reflected by this relationship, can be controlled with the same settings, in order to be able to reproduce in the optical image of the representation of the virtual background circles of confusion expected in the theoretical image. Furthermore, the calculation device can be configured to computationally adapt possible setting instructions for the background display device and to determine the expected imaging parameter in the optical image of the representation of the virtual background that can be generated by the camera, in order to generate a setting instruction in which the imaging parameter approximates as much as possible the imaging parameter of the theoretical image. The setting instructions can relate to, in particular, colour and/or brightness settings of the lighting means of the background display device.

Furthermore, the calculation device can be configured to determine a theoretical image that would result from imaging a real background corresponding to the virtual background by means of the camera, and an optical image of the representation of the virtual background by means of the camera in dependence of the lens data, wherein the calculation device and/or the control device can be configured to determine setting instructions for the background display device by comparing the two images. For example, the calculation device can be configured to calculate or simulate the theoretical image and the optical image of the representation of the virtual background for different lens data, in particular different lens setting values, and to adapt the setting instructions for the background display device computationally until the calculated or simulated image of the representation of the virtual background is as close as possible to the theoretical image. For this purpose, for example, the calculation device can use or carry out image analysis methods. The settings determined in this way can then be transmitted to or received by the control device as setting instructions in order to control the background display device.

In some embodiments, the calculation device can be configured to calculate the imaging parameters of the optical image and/or the imaging parameters of the theoretical image in dependence of the received lens data. Alternatively, or additionally, the calculation device can be configured to look up in a database, the imaging parameters of the optical image and/or the imaging parameters of the theoretical image in dependence of the received lens data. In particular, for the theoretical image, that would arise from an imaging of a real background corresponding to the virtual background by means of the camera, imaging parameters dependent on the lens data, in particular lens setting values, can be stored in a data base. In addition, imaging parameters for the optical image of the representation of the virtual background that can be generated by the camera in dependence of the received lens data, can be stored in the data base, in particular for different settings of the background display device and for different background regions. As a result, a setting of the background display device can be directly determined for each background region, by which the imaging parameters are as close as possible to one another, and the representation can be adjusted accordingly by the control device. As an alternative to this, the calculation device can be configured to calculate the imaging parameters in dependence of the received lens data, in particular, taking into account the respective position information of the background regions.

In some embodiments, the calculation device can be configured to determine setting instructions for the background display device based on the determined imaging parameters of the optical image and the determined imaging parameters of the theoretical image, wherein the control device can be configured to execute the setting instructions for adjusting the representation of the virtual background. In particular, the calculation device can be configured to determine the setting instructions by comparing the imaging parameter of the optical image with the imaging parameter of the theoretical image. For example, the calculation device can calculate as an imaging parameter for a respective background region, a brightness with which the background region is imaged dependent on a diaphragm aperture, which can be transmitted as a lens setting value or with the lens data, and can output a setting instruction so that the background region in question is displayed in the optical image of the representation of the virtual background that can be generated by the camera, with a brightness that corresponds to the brightness of the background region in the theoretical image of a real background corresponding to the virtual background. If, for example, a background region experiences a stronger darkening in the theoretical image than the corresponding background region in the optical image of the representation of the virtual background due to a closing of a diaphragm aperture, this background region can be shown darkened on the background display device in such a way that ultimately results in the same darkening in the optical image of the representation of the virtual background as in the theoretical image.

In some embodiments, the calculation device can be configured to determine a measure for a blurring of the background regions in the optical image and in the theoretical image. For example, for this purpose, a diameter of circles of confusion can be determined as a measure of blurring and can be used as an imaging parameter to adjust the representation of the virtual background.

Thereby, the calculation device can be configured to determine the measure of the blurring of the background regions in dependence of values of a diaphragm aperture and/or a focal length and/or a focusing distance of the camera. For example, the calculation device can calculate a diameter of circles of confusion based on the diaphragm aperture and position information assigned to respective background regions and use it as an imaging parameter.

Furthermore, the calculation device can be configured to determine a depth of field in dependence on values of a diaphragm aperture and/or a focal length and/or a focusing distance. The depth of field indicates a range of distances to the camera in which objects arranged therein are imaged sharply by the camera. By calculating a depth of field, background regions in particular can be determined which in the theoretical image of a real background corresponding to the virtual background in accordance with received lens data, lie in the range of the depth of field and accordingly would be represented sharply in a theoretical image of the real background. For these background regions, the background display device can, in particular, be set in such a way that the background regions are represented with maximum sharpness. Background regions lying outside the depth of field for the received lens data in a real background corresponding to the virtual background can, on the contrary, be represented more blurred in the representation generated by the background display device in order to be able to generate a natural bokeh in the optical image of the representation generated by the camera. For example, the distance of a respective background region from the depth of field or from a front and/or rear hyperfocal plane can determine a blurring to be generated in the representation of the virtual background, so that the depth of field or this distance can form a measure of the blurring.

Furthermore, the calculation device can be configured to divide the background regions into respective sharpness regions, wherein the control device can be configured to control the background display device to represent the background regions with a sharpness assigned to a respective sharpness region. For example, the calculation device can be configured to divide the background regions into different sharpness regions depending on a distance from a calculated front and/or rear hyperfocal plane. In dependence of a respective sharpness region which is assigned to a background region, setting instructions for the background display device can thereupon be determined or generated in order to represent the background regions with a respective blurring. For example, a number of adjacent lighting means of the background display device can be assigned to the sharpness regions for this purpose, which are to be operated with the same settings, in particular the same colour and/or brightness, to produce a blurring. In particular, a respective circle of confusion approximating the theoretical image can be generated in the sharpness regions in the optical image of the representation of the virtual background, wherein such circle of confusion can, for example, be randomly distributed in the respective sharpness regions or formed around respective brightest points. For distributing the circles of confusion, for example, information about the lens used or digital filters that correlate with the lens can used.

In some embodiments, the calculation device can be configured to determine diameters of circles of confusion in the optical image and in the theoretical image for the background regions in dependence of a diaphragm aperture and/or a focal length and/or a focusing distance. Furthermore, the calculation device can be configured to generate setting instructions for the background display device in such a way that the diameters of the circles of confusion in the optical image approximate the diameters in the theoretical image. In addition, it can be provided for, that the representation is adjusted by the control device in such a way that circles of confusion that form in the theoretical representation of a real background corresponding to the virtual background also arise in the optical image of the representation of the virtual background in order to achieve the most natural possible bokeh of the optical image. For example, the background display device can be controlled for this purpose in such a way that respective brightest points in the virtual background are imaged as circles, which in the optical image have the diameter as expected in the theoretical image.

Furthermore, the calculation device can be configured to determine superpositions of circles of confusion in the optical image and in the theoretical image. For this purpose, the calculation device can, in particular, draw on a model of the virtual background stored in a memory and/or transmitted information about a lens connected to the camera, in particular an interchangeable lens, so that when adjusting the representation of the virtual background by means of the background display device, also such lens-specific and/or distance-dependent superimpositions of circles of confusion can be taken into account in order to be able to reproduce as accurately as possible the bokeh in the optical image of the representation of the virtual background.

In some embodiments, the calculation device can be configured to determine a measure of a brightness of the background regions in the optical image and in the theoretical image as an image parameter.

The calculation device can be configured to determine the measure for the brightness in dependence of a diaphragm aperture, wherein the calculation device can, in particular, be configured to determine a distance-dependent change in brightness in dependence of the diaphragm aperture. For example, the calculation device can determine from a certain distance a portion of emitted light, in particular optically isotropic, which impinges an image sensor of the camera, in dependence of the diaphragm aperture. This portion can be determined, for example, by an opening angle of a cone of rays which, starting out from an object in the representation of the virtual background or in the real background, then passes through the diaphragm aperture. This can make it possible to determine a relationship of the brightness of a background region in the theoretical image to the brightness of the background region in the optical image of the representation of the virtual background, and taking this relationship into consideration, to represent an adjusted background region by means of the background display device.

Alternatively, or additionally, in some embodiments it can be provided for, that the calculation device is configured to determine the imaging parameters in dependence of information about a lens connected to the camera. In particular, for this purpose, the camera can be connectable to an interchangeable lens so that it can be determined on the basis of the information, which lens or what type of lens is used in order to adjust accordingly the representation and, for example, to adapt the shapes of blurred regions in the optical image of the representation of the virtual background generated by the camera, to the shapes of those blurred regions in a theoretical image which the camera would generate when imaging a real background corresponding to the virtual background. In particular, dependent on information about the lens type and received lens setting values, the calculation device can look up respective imaging parameters in a databank in order to generate setting instructions for the background display device for adjusting the representation of the virtual background which can be implemented by the control device.

The information can include distance-dependent optical aberrations of the interchangeable lens. In particular, such aberrations can comprise shapes of circles of confusion, their diameter and/or diffraction effects. Furthermore, the information can basically comprise any property of the lens and, for example, a shape of an iris diaphragm, in particular, a number of blades or lamellae of the iris diaphragm, a number, an arrangement and/or properties of the cylindrical elements of anamorphic lenses and/or properties of any coatings of the elements of the camera lens, such as the lenses.

Furthermore, the calculation device can be configured to access a database with computational instructions for determining setting instructions for the background display device and to determine the setting instructions in dependence on the information based on the computational instructions. For example, digital filters that correlate with the lens type can be stored in such a database, wherein the calculation device can calculate, on the basis of such digital filters, the theoretical image and/or the optical image of the representation of the virtual background, in order to be able to determine or generate setting instructions for the background display device by comparing both of these images. In this case, lens parameter values or lens setting values transmitted as lens data can be applied in such a digital filter, so that, by means of the digital filter, both lens-specific effects, for example, a shape of a blurred region, and the setting of the respective lens can be taken into account.

The invention further relates to a recording system with a background display system as disclosed herein and having a camera that comprises a camera lens and that is configured to transmit lens data of the camera lens to the data input of the control device. In particular, the recording system can involve a moving image recording system, so that the camera can be designed as a moving image camera for recording a scene, in particular a film scene. Alternatively, it can also be provided for, that by means of a background display device as described above, a virtual background is represented which serves as a background for a photo recording, so that the camera can also be designed as a photo camera.

Since the camera is configured to transmit lens data of the camera lens to the data input of the control device, this lens data can be taken into account when controlling the background display device. In particular, this makes it possible to adjust the representation of the virtual background dependent on the received lens data in such a way, that the optical image generated by the camera approximates a theoretical image that the camera would generate if a real background corresponding to the virtual background were recorded. The representation can, in particular, be adapted in such a way, that a bokeh that appears as natural as possible can be achieved in the optical image of the representation of the virtual background generated by means of the camera.

The camera can comprise an image sensor in order to convert incident light into electrical signals and to be able to generate an image. Furthermore, the lens can comprise a lens and/or a lens system in order to be able to guide the light impinging onto the image sensor. The lens can comprise a diaphragm with a diaphragm aperture that can be opened or closed as required in order to be able to adjust the portion of light that reaches the image sensor and a depth of field. Furthermore, it can be provided for, that a focal length or focusing distance of the lens or the lens system is adjustable, for which purpose, for example, one or more lenses of the lens system can be displaced relative to one another. Such adjustments to parameters of the lens can take place, for example, by manually and/or electrically rotating one or more lens rings.

In some embodiments, the recording system can comprise a position determining device which is configured to determine a position of the camera relative to the background display device and to transmit corresponding position data to the data input of the control device. For example, for this purpose, the position determining device can comprise auxiliary cameras which optically detect the position of the camera provided for recording a scene relative to the background display device.

The position data can also be used to adjust the representation of the virtual background in such a way that the optical image generated by the camera is approximated to a theoretical image of a real background corresponding to the virtual background. In particular, when the camera moves during the recording of a scene or a film scene, objects in the representation of the virtual background can be shifted in such a way, that the position of the objects in the optical image of the representation of the virtual background corresponds to the position of these objects in the theoretical image of the real background.

The invention also relates to a method for controlling a background display device, which is configured to display, whether behind or above a real subject, a representation of a virtual background for a recording by means of an associated camera, having the following steps:
receiving lens data from the associated camera; and
adjusting of the representation of the virtual background in dependence of the received lens data.

As already explained above in relation to the background display system and the recording system, such a control of a background display device enables, in particular, a representation of the virtual background generated by the background display device to be adjusted in such a way that an optical image of the representation of the virtual background generated or can be generated by the associated camera, is approximated to a theoretical image which the camera would generate when recording a real background corresponding to the virtual background. In particular, distance-dependent effects can be reproduced in the optical image of the representation of the virtual background.

In some embodiments, the method may further comprise the steps of:
recording a real subject in front of the background display device by means of the associated camera;
acquiring lens data of a camera lens of the associated camera; and
transmission of the lens data to the background display device or to a control device assigned to the background display device.

In particular, the lens data can comprise lens setting values or parameter values of the lens. To acquire the lens setting values, the camera can comprise respective sensors, which can be designed, for example, to determine a rotational position of a lens ring for adjusting a diaphragm aperture, a focal length and/or a focusing distance.

In some embodiments, the background display device comprises a two-dimensionally extending active illumination apparatus. In turn, the active illumination apparatus enables the representation of the virtual background by way of a plurality of lighting means, in particular, light-emitting diodes or LEDs or OLEDs, which can be controlled, individually or in respective groups. Furthermore, it is also possible to represent movements in the virtual background, for example, cars driving by during a film scene.

In some embodiments, the lens data can represent set values of at least one of the following lens parameters: a diaphragm aperture, a focusing distance and/or a focal length. In particular, these parameters can generate distance-dependent effects in an optical image that can be generated by means of the camera. By considering the lens data when adjusting the representation of the virtual background, these effects can be reproduced in an optical image of this representation by means of the camera in such a way that the effects are similar to those in a theoretical image of a real background corresponding to the virtual background. Furthermore, in some embodiments, the lens data can comprise information about the lens used, in particular, a lens type and/or an identification of the respective lens used, for example, a serial number. As a result, lens-specific effects can also be produced in the optical image of the representation of the virtual background.

In some embodiments, the virtual background can represent a three-dimensional scene and different regions of the three-dimensional scene can be represented with different sharpness dependent on the received lens data. In particular, distance values assigned to the respective regions from the background display device and/or the camera, can be taken into account when setting the sharpness in the representation of these regions.

It can be provided for, that the representation of the virtual background is adjusted in such a way, that an optical image of the representation of the virtual background that can be generated by means of the associated camera in accordance with the transmitted lens data is approximated to a theoretical image that would be generated if a real background corresponding to the virtual background was imaged by means of the associated camera. In particular, the representation can be adjusted in such a way that distance-dependent effects are reproduced in the optical image of the representation of the virtual background.

Distance-dependent effects which arise or can change, in particular, when also changing the lens setting values transmitted as lens data during a recording, do not get lost, for example, due to the display of the virtual background on the background display device which in particular can be configured to be planar and/or two-dimensional, but can be reproduced by adjusting the representation of the virtual background in the optical image generated by the camera. In particular, a bokeh can thereby be generated in the optical image which corresponds to and/or approximates the bokeh which arises in a theoretical image of a real background corresponding to the virtual background.

In some embodiments, the representation of the virtual background can be generated based on a model which is read out from a memory. In doing so, the stored model of the virtual background can comprise for a plurality of background regions, a respective image information and a respective position information. In principle, the image information can serve to generate the representation of the virtual background, while the position information can be used together with the received lens data to adjust the representation.

Furthermore, in some embodiments, it can be provided for, that diameters of circles of confusion in an optical image of the representation of the virtual background that can be generated by means of the camera, and diameters of circles of confusion in a theoretical image that would be generated if a real background corresponding to the virtual background was imaged by means of the camera, can be determined for a plurality of background regions in dependence of the lens data, wherein the representation of the virtual background can be adjusted in such a way, that the diameters of the circles of confusion in the optical image approximate the diameters of the circles of confusion in the theoretical image. In particular, the diameter of the circles of confusion can serve as a measure of blurring whereby, by generating circles of confusion with the diameter corresponding to the diameter of circles of confusion in the theoretical illustration, in particular, distance-dependent blurring effects can be produced in the optical image of the representation of the virtual background.

Furthermore, essentially all steps or a selection of steps can be included in the method, which steps are described above in reference to the control device or the calculation device of the background display system and/or the background display device.

The invention is described hereinafter purely by way of example with reference to the embodiments in reference to the drawings.

Figure 3B:
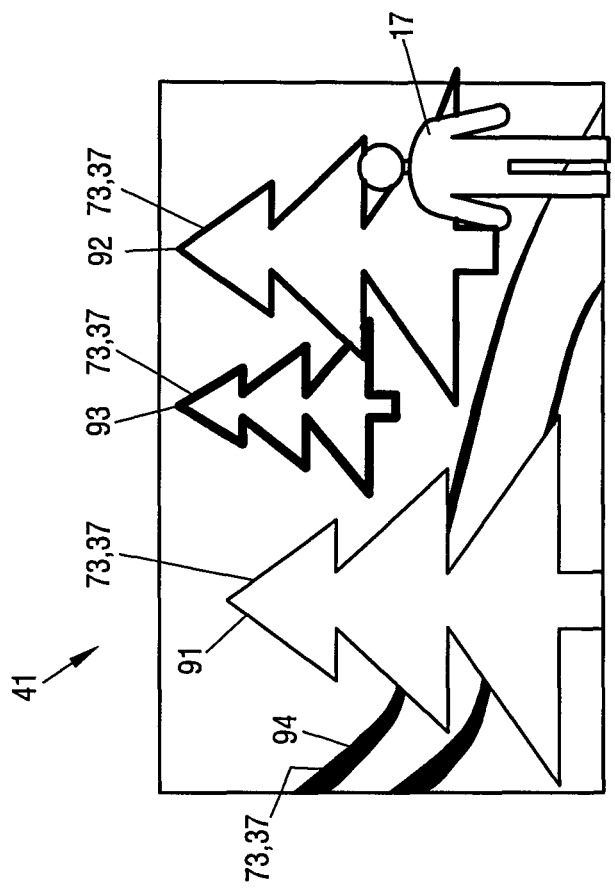
Figure 3A:
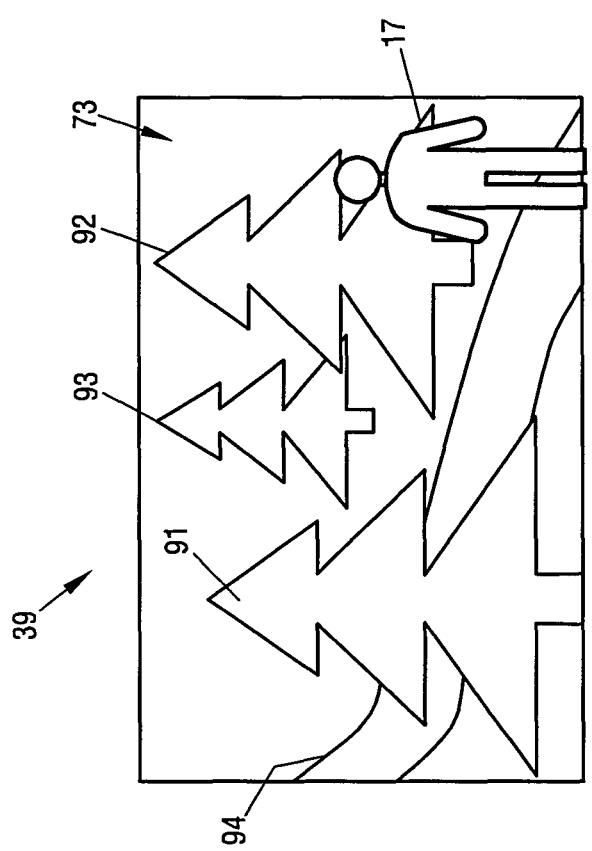
Figure 4:
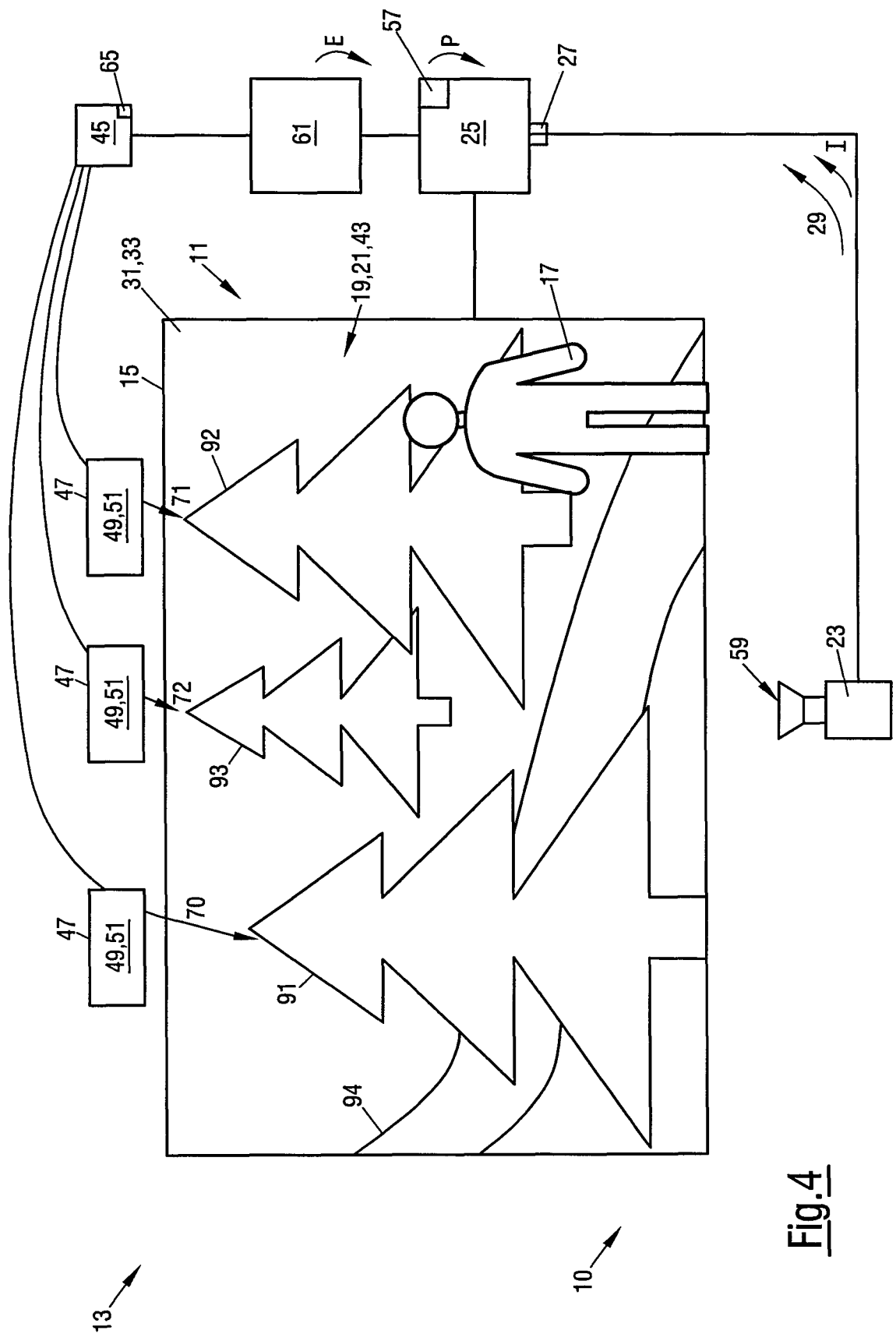
Figure 5:
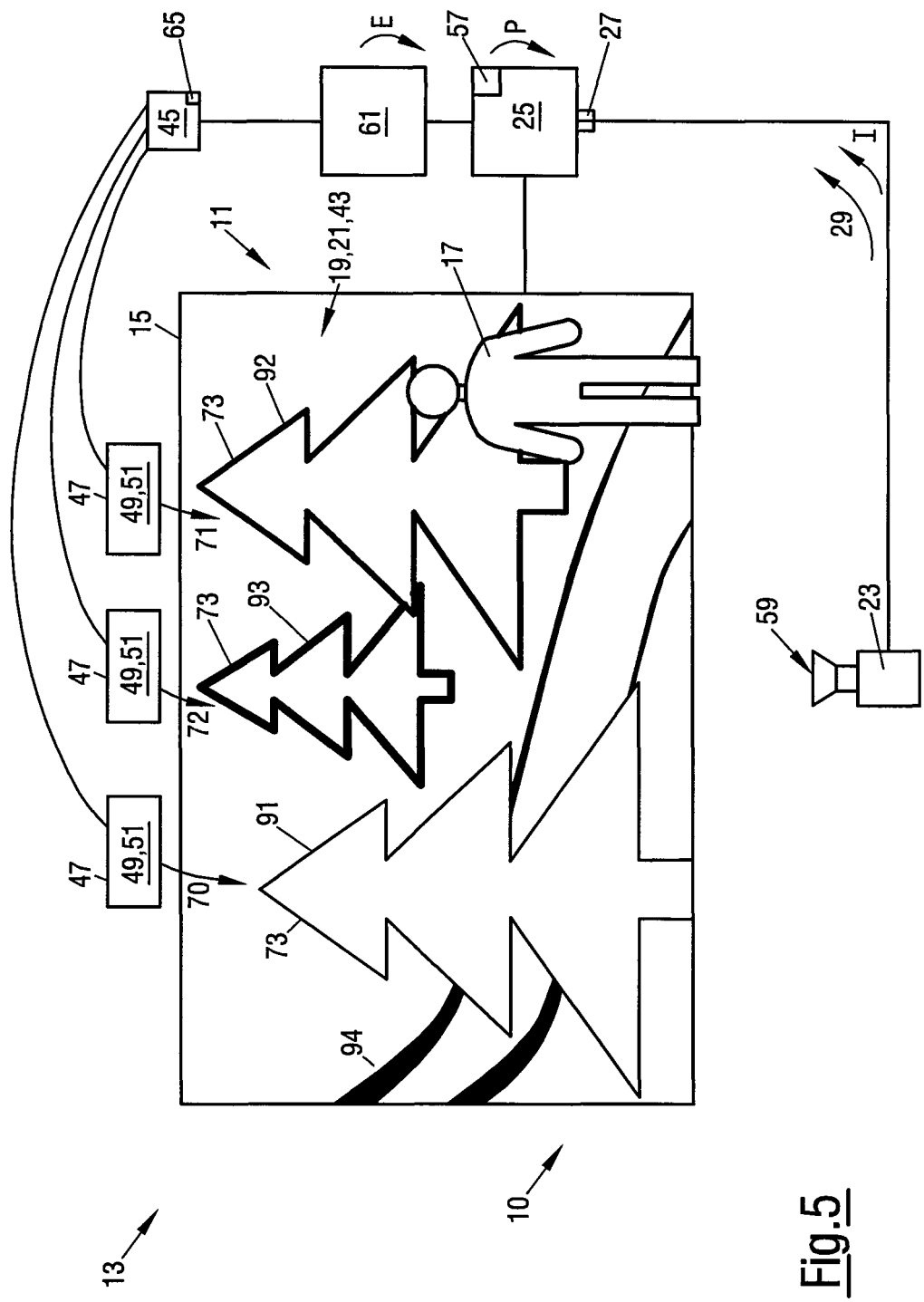
Figure 6A:
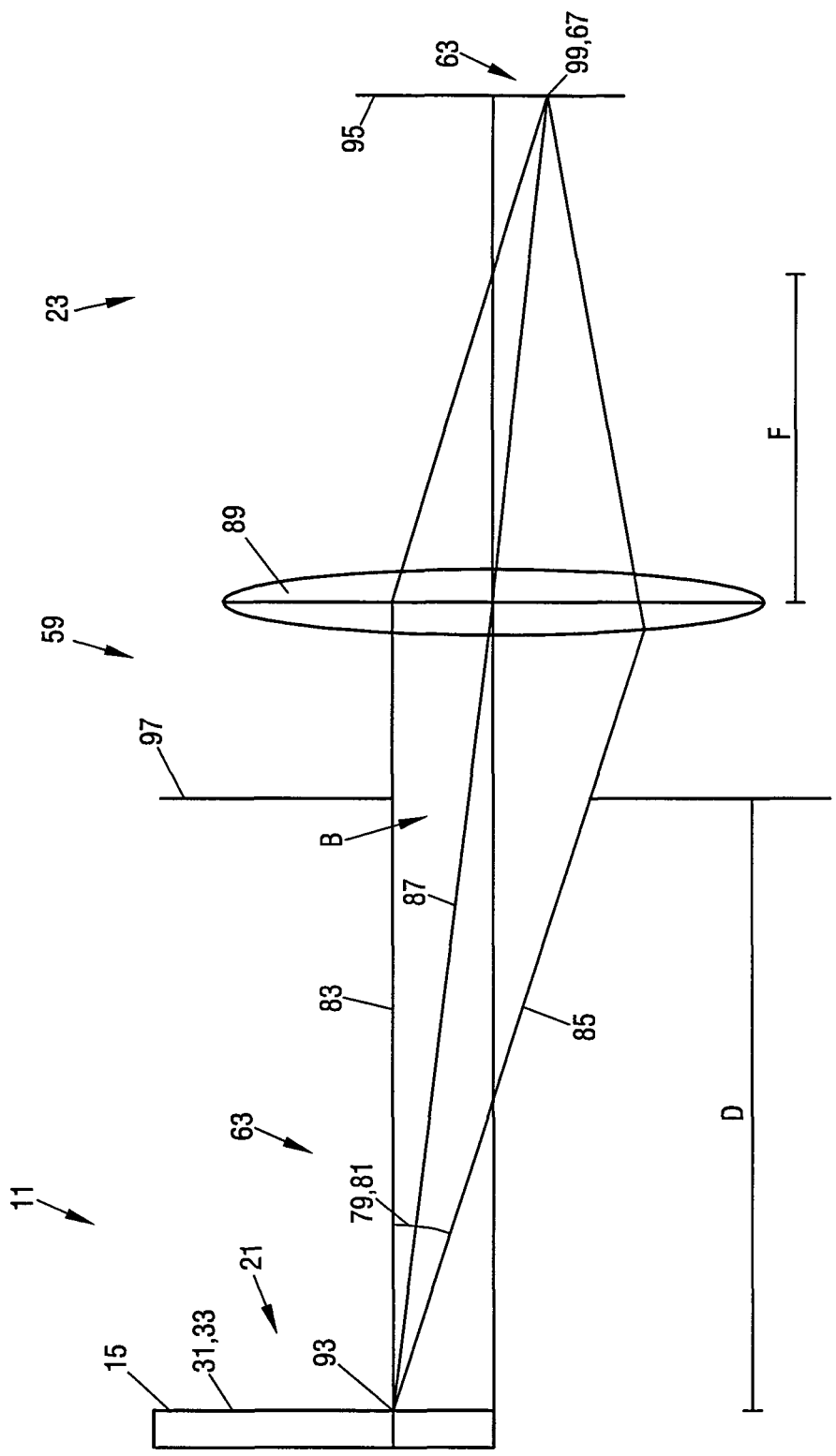
Figure 6B:
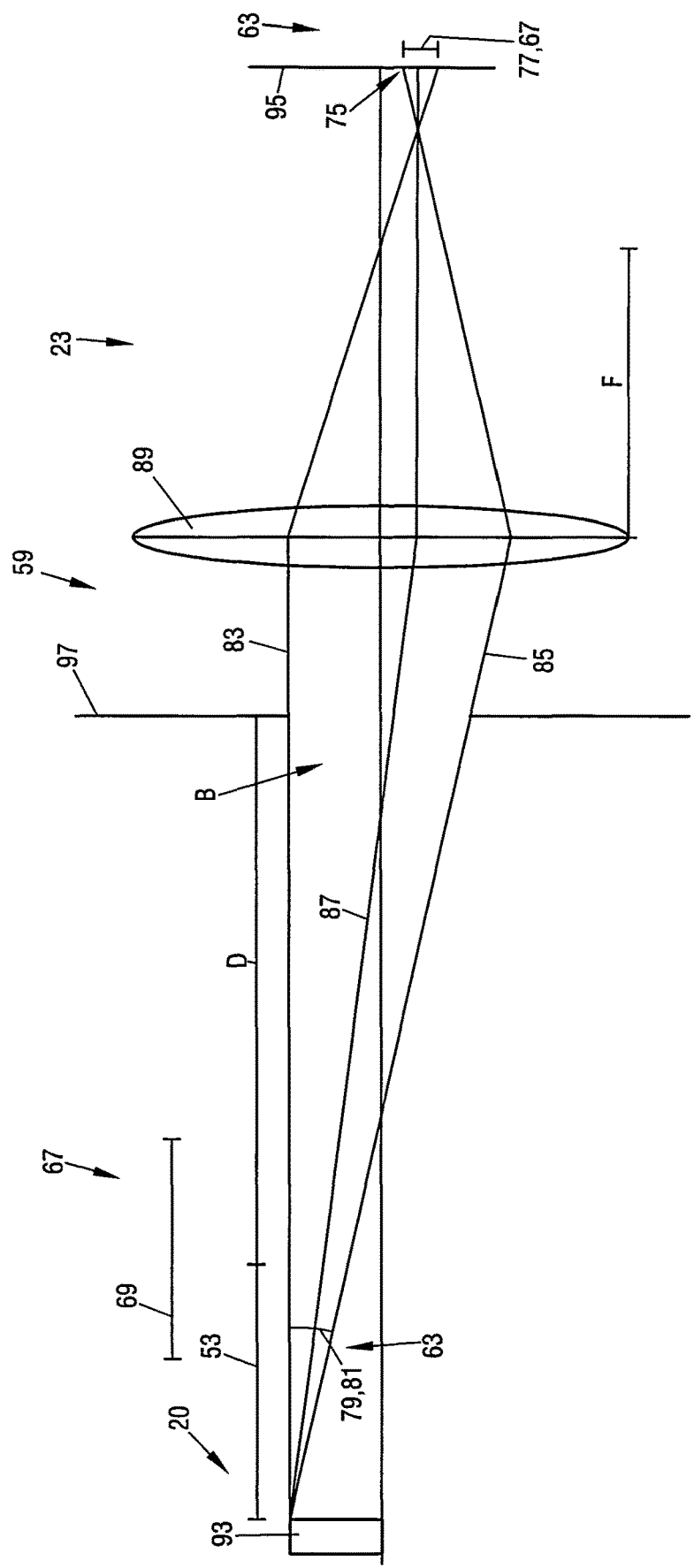
Figure 6C:
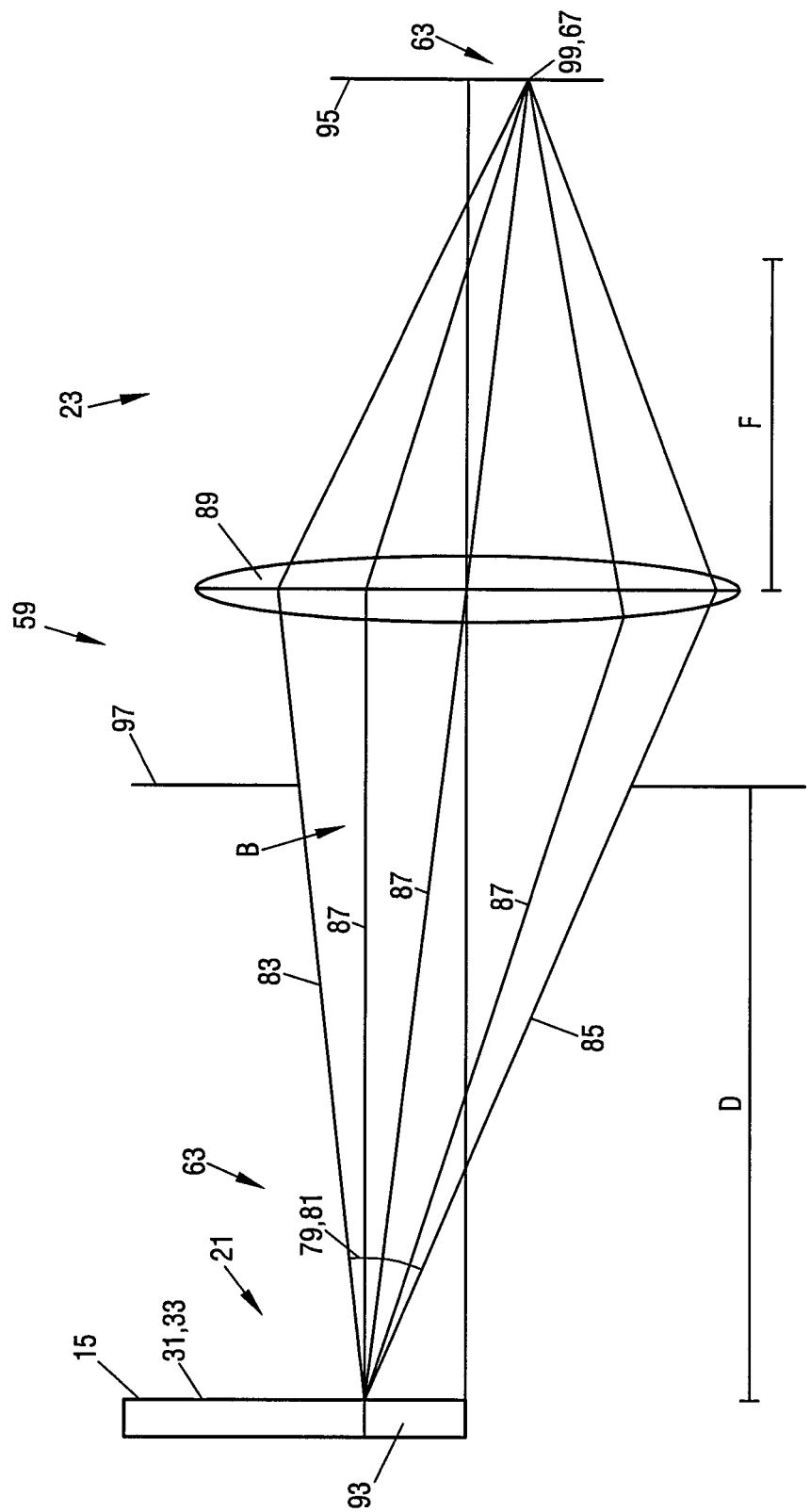
Figure 6D:
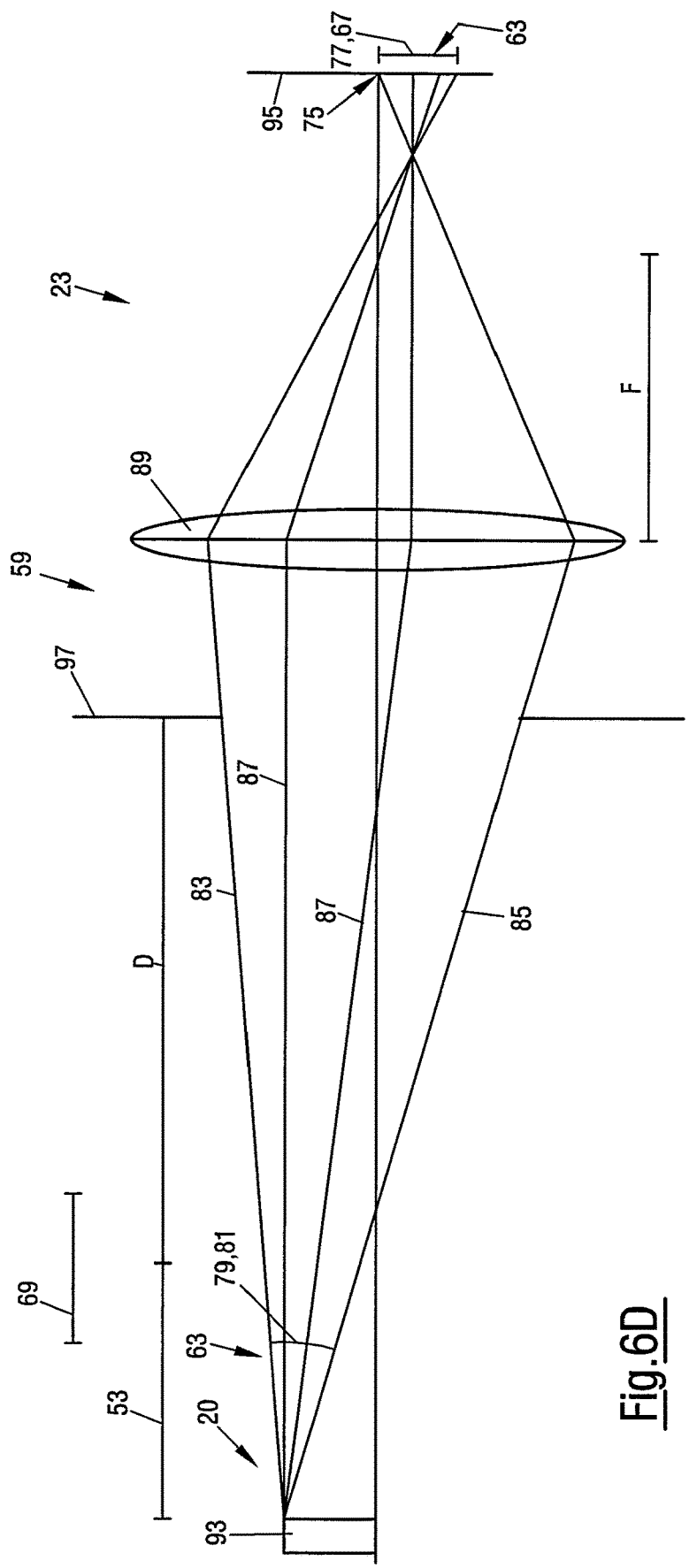
Figure 6E:
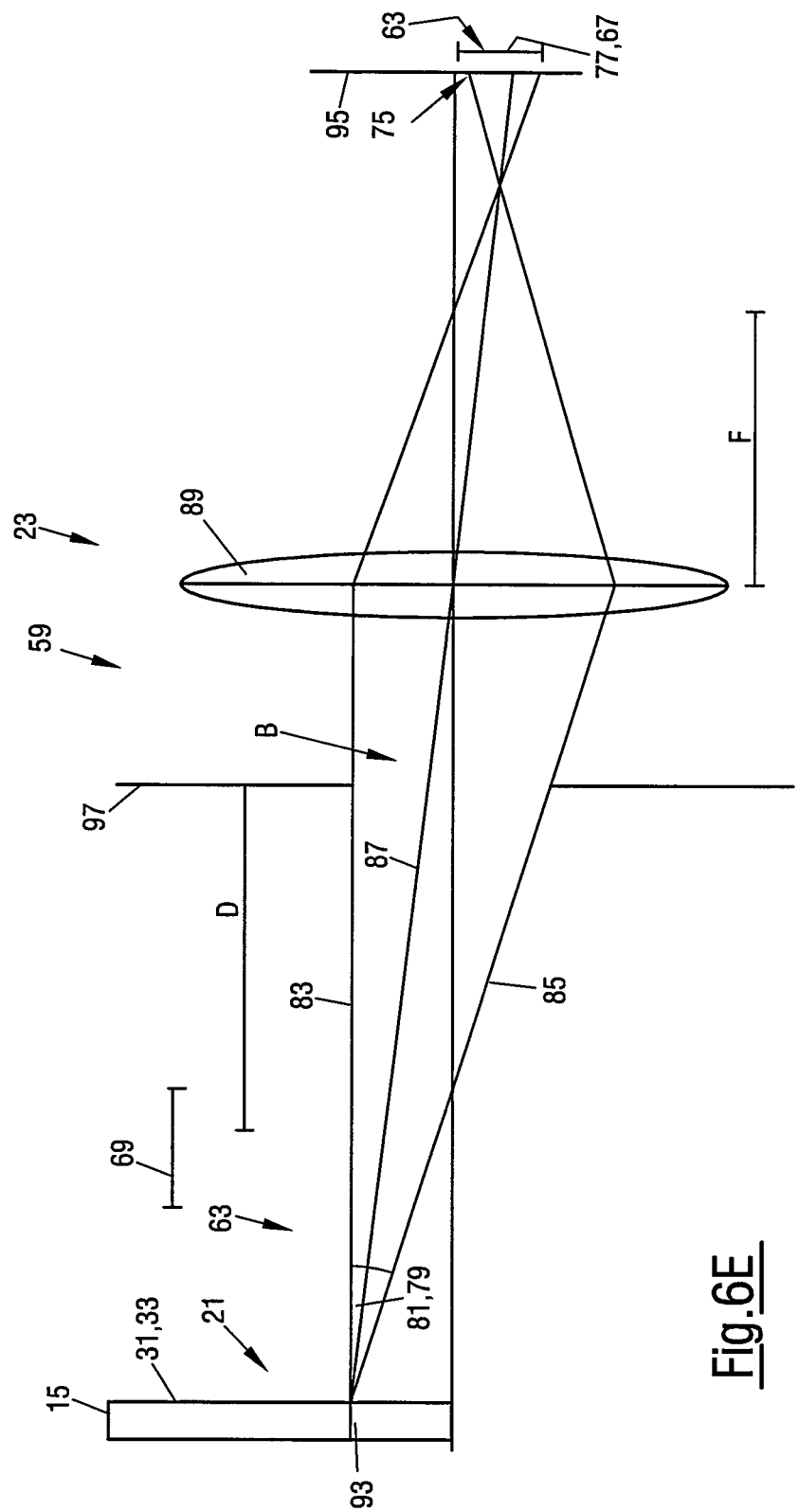
Figure 6F:
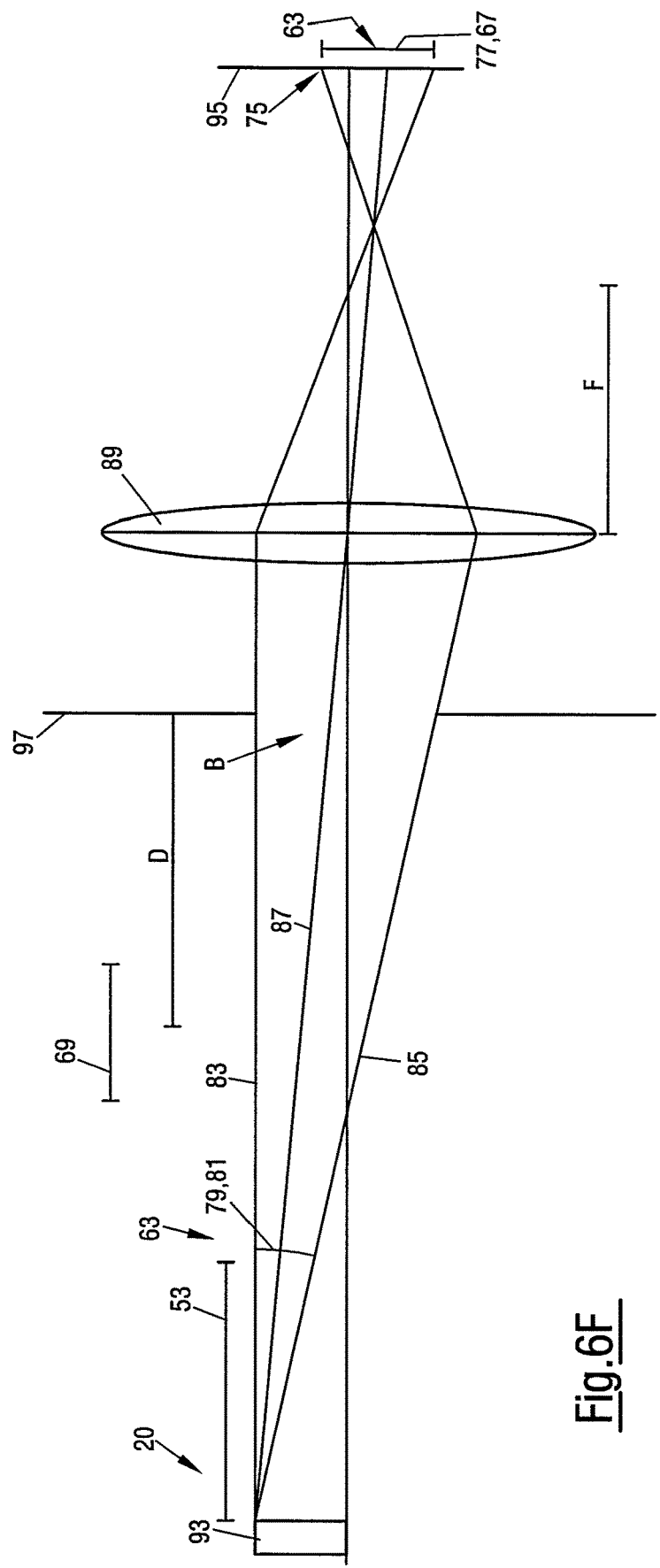
Figure 7A:
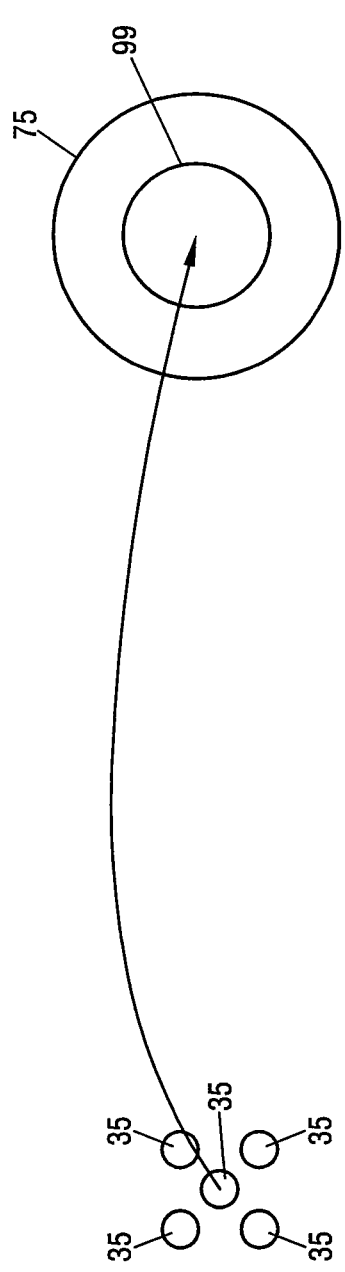
Figure 7B:
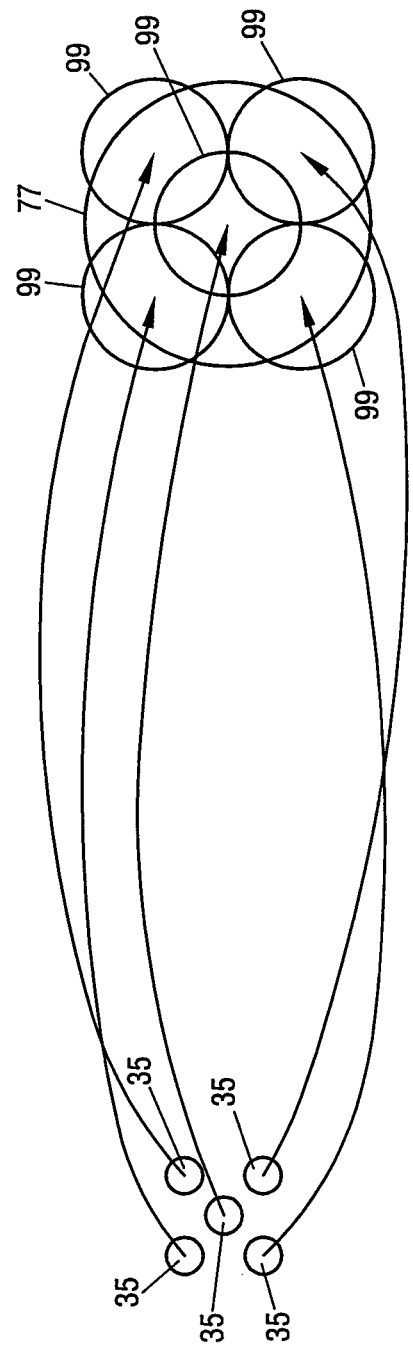

FIG. 1 shows a schematic diagram of a recording system for an image recording studio having a background display system and a camera, FIGS. 2A and 2B show a schematic diagram of a recording carried out by the camera in front of a virtual background generated by a background display device of the background display system, as well as a schematic diagram of a recording in front of a real background corresponding to the virtual background, FIGS. 3A and 3B show a schematic diagram of an optical image that can be generated by the camera when recording the virtual background, as well as a schematic diagram of a theoretical image which would result from a recording of the real background by means of the camera, FIG. 4 shows a further schematic diagram of the recording system to illustrate the adjustment of the representation of the virtual background generated by the background display device in dependence of the received lens data, FIG. 5 shows a schematic diagram of the recording system with an adjusted representation of the virtual background, FIG. 6A to 6F show respective schematic illustrations of a beam path through the camera when recording the virtual background or the real background for different lens setting values transmitted as lens data, FIGS. 7A and 7B show a respective schematic illustration for generating a circle of confusion of the theoretical image corresponding to the real background when recording the virtual background, and FIG. 8A to 8F show respective schematic illustrations for adjusting the representation of the virtual background generated by the background display device in dependence of the determined position data of the camera.

FIG. 1 schematically shows a virtual image recording studio 13, in which a scene, in particular in the form of a moving image recording and/or a photo recording, can be recorded by means of an associated camera 23. The camera 23 can, in particular, be designed as a moving image camera in order to carry out moving images recordings that can be stored as a series of images 39 generated by the camera 23. For this purpose, the camera 23 has a lens 59, which can in particular be designed as an interchangeable lens, which can optionally be connected to a housing of the camera 23. As a result, a respective lens 59, optimally adjusted to the environment in the image recording studio 13, can always be used in order to be able to generate the best possible recordings. In particular, an image sensor 95 can be arranged in the housing of the camera 23 onto which light enters, via a diaphragm aperture B of a diaphragm 97 and guided by means of a lens system or at least one lens 89, to generate an optical image 39 (see also FIGS. 6A to 6F).

Furthermore, a background display system 11 having a background display device 15 is arranged in the image recording studio 13, which, together with the camera 23, is part of a recording system 10. The background display device 15 comprises an active illumination apparatus 31 configured as an LED wall 33 and is configured to display a representation 19 of a virtual background 21 for a recording by means of the camera 23. For this purpose, the illumination apparatus 31 or the LED wall 33 comprises a plurality of individually controllable light-emitting diodes 35 which are arranged next to one another in a two-dimensional arrangement. Alternative to this, the active illumination apparatus 31 can comprise, for example, an OLED wall, or the background display device 15 can be configured to generate the representation 19 of the virtual background 21 by means of a rear projection.

The representation 19 of the virtual background 21 reflects here, for example, a three-dimensional scene 43 with objects 91, 92, 93 and 94, three trees and a path, which can be generated by appropriate control of the light-emitting diodes 35, in particular, by an appropriate setting of their respective colour and brightness. The three-dimensional scene 43 is projected onto the essentially two-dimensional arrangement of the light-emitting diodes 35 of the illumination apparatus 31, wherein, in particular, the objects 91, 92 and 93 appear at a different distance to the illumination apparatus 31 or the background display device 11, in order to recreate the three-dimensionality of a real background 20 corresponding to the virtual background 21 (cf. also FIGS. 2A and 2B).

In particular, the representation 19 of the virtual background 21 by way of the background display device 15, serves to generate a background for a recording of a real subject 17, for example an actor, in front of which a recording can be made or a film scene can be played. As a result, basically any kind of landscapes, spaces or environments can be created in the image recording studio 13, in front of, or, in which, a scene, for example, for a movie, is to be filmed. It is also possible, by a time-variable control of the light-emitting diodes 35, to show movements in the virtual background 21, for example, a passing car, to which the actor 17 can react in an easy and improved manner compared to a scene in front of a Green-Screen.

The background display device 15 extends here essentially in the vertical direction, so that the actor 17 can move in front of the virtual background 21. However, in order to be able to depict the virtual background 21 more extensively, the background display device 15 can also extend around or above the actor 17, whereby the background display device 15 above the actor 17 can exhibit, in particular, a horizontal orientation. In order to surround the actor 17 or to be able to generate a transition from the shown vertical orientation to a horizontal orientation, the background display device 15 or the illumination apparatus 31 or the LED wall 33 can also be arched or curved, at least in sections.

In addition to representing the virtual background 21, the background display device 15 can also serve to illuminate the real subject 17 and thereby facilitate, for example, as further studio lighting for the image recording studio 13. Furthermore, by illuminating the real subject 17 by means of the background display device, the interaction of the real subject 17 or the actor 17 with the light sources present in the virtual background 21, for example, lanterns or lamps, can be improved, in that, the real subject 17 casts a shadow which corresponds to the light conditions visible in the optical image 39 generated by the camera 23.

While such a background display device 15 can thus offer diverse and convenient possibilities for recording scenes, in particular, moving image recordings in an image recording studio 13 having basically any virtual background 21, due to the projection of the three-dimensional scene 43 onto the two-dimensional background display device 15, can result, in particular, in differences between an optical image 39 of the representation 19 of the virtual background 21 generated by the camera 23 and a theoretical image 41, which the camera 23 would generate by a recording of the real background 20 corresponding to the virtual background 21 (cf. FIGS. 3A and 3B).

As FIGS. 2A and 2B illustrate, the objects 92 and 93, projected onto the illumination apparatus 31 in the representation 19 of the virtual background 21, have respective distances 54 and 53 to the background display device 11 in the real background 20 corresponding to the virtual background 21, such that the theoretical image 41 of the real background 20 shown in FIG. 3B can differ from the optical image 39 of the virtual background 21 or its representation 19, as can be seen from the comparison with FIG. 3A. In particular, objects 92 and 93 which are further away and also, a part of the object 94 are shown blurred in the theoretical image 41, while the objects 91, 92, 93 and 94 are shown completely sharp in the optical image 39. Settings of the lens 59 or changes in the settings can also affect differently the optical image 39 of the representation 19 of the virtual background 21 and the theoretical image 41 of the real background 20.

For example, a diaphragm aperture B or the opening width of an iris diaphragm of the lens 59 can influence the depth of field 69 of the lens 59, such that the objects 91, 92 and 93 dependent on their distance 53, 54 from the camera 23 and dependent on the diaphragm aperture B in the theoretical image 41 of the real background 20 corresponding to the virtual background 21, can be imaged with varying sharpness 73 (cf. FIG. 3B). If, on the other hand, the camera 23 is set to be focused on the background display device 11, this distance-dependent imaging effect 37 of a varying sharpness 73 is not reproduced in the optical image 39 of the representation 19 of the virtual background 21. Rather, all objects 91, 92 and 93 are imaged with the same and, here, for example, with full sharpness 73, with a focus on the background display device 15, also independent of the diaphragm aperture B (cf. FIG. 3A and FIGS. 6A to 6D).

The sharpness or blur gradients in the theoretical image 41 accompanied with these distance-dependent imaging effects 37 can thus be lost in the optical image 39 which the camera 23 creates of the representation 19 of the virtual background 21. Such a texture in the sharpness of a background can, however, determine the bokeh of the optical image 39, whereby the generation of a pleasant and realistic bokeh can be a concern in such a recording and can also determine the choice of the lens 59 which is connected to the camera 23. In addition, during the recording of a scene, changing the settings of the lens 59, for example, by opening or closing the aperture 97, can affect distance dependency and varying sharpness 73 of the objects 91, 92, 93 and 94 in the theoretical image 41, whereby the changing bokeh corresponding to the theoretical image 41 of the real background 20 should also be generated as much as possible in the optical image 39 of the virtual background 21 generated by the camera 23.

To address this problem, as shown in FIG. 4, the background display system 11 comprises a control device 25 which is connected to the background display device 15 and is configured to control the background display device 15. Thereby, the control device 25 which can, for example, be designed as a microprocessor, comprises a data input 27 in order to receive lens data 29 transmitted by the camera 23, and in addition, the control device 25 is configured to adjust the representation 19 of the virtual background 21 dependent on the received lens data 29 (cf. also FIG. 5).

The lens data 29 can thereby comprise, in particular, lens setting values or values of parameters of the lens 59 on to which these parameters are set, and/or an information I about the lens 59 used. For example, the lens data 29 can pertain to a diaphragm aperture B, a focusing distance D and/or a focal length F of the lens 59 and represent values to which these parameters of the lens 59 are set or adjusted to. The information I can represent, for example, a lens type, an identification of the lens 59 used such as a serial number, a shape of an iris diaphragm 97 of the lens 59, the number of blades of the diaphragm 97, an arrangement or configuration of the cylindrical elements of an anamorphic lens 59 and/or any coatings of the optical elements of the lens 59, for example, of individual lenses 89. By taking into account such lens data 29, the representation 19 of the virtual background 21 can, in particular, be adapted in such a way that the optical image 39 generated by the camera 23 approximates the theoretical image 41. In particular, different regions of the three-dimensional scene 43 can therefore be represented with different sharpness 73, in order to recreate in the optical image 39 a blurred gradient of the theoretical image 41.

In order to adapt the representation 19 of the virtual background 21, the control device 25 is connected to a calculation device 61 and, via the calculation device 61 connected to a memory 45. As illustrated here, the calculation device 61 can be connected to the control device 25 as a separate unit, for example, as a microprocessor or a CPU. Alternatively, the calculation device 61 can also be integrated into the control device 25. The control device 25 can also be directly connected to the memory 45.

A model of the virtual background 11 is stored in the memory 45 and based on this, the control device 25 can generate the representation 19 of the virtual background 21 by means of the background display device 15. The stored model comprises respective image information 49 and respective position information 51 for a plurality of background regions 47. The position information 51 can comprise, for example, the distances 53 and 54 of the objects 93 and 92 from the background display device 15 (cf. FIG. 2B).

In addition, the control device 25 can be configured to generate the representation 19 of the virtual background 21 based on the image information 49 for the background region 47, and to adjust it taking into consideration the position information 51 and the received lens data 29. To generate the representation 19, the control device 25 can use, in particular, a game-engine. For example, the calculation device 61 can be configured to read out the position information 51, which alternatively or in addition to the above-mentioned distances 53 and 54 can also comprise three-dimensional coordinates of the background regions 47 or of the objects 91, 92, 93 and 94, and to generate setting instructions E for the control device 25 in dependence of the received lens data 29, and which the control device 25 carries out to adjust the representation 19 of the virtual background 21. For example, the calculation device 61 can organise the respective background regions 47 into respective sharpness regions 70, 71 and 72 in dependence of the received lens data 29, for example, in dependence of the diaphragm aperture B, and by transmitting a setting instruction E cause the control device 25 to represent the background regions 47 with a sharpness 73 corresponding to the respective sharpness regions 70, 71 or 72 (cf. FIG. 5).

For example, it can be provided for, that the object 93 in the real background 20 that is furthest away from the background display device 15 or the camera 23, or the background region 47 in which this object 93 is located, is represented blurred by means of the background display device 15, and also the object 92 spaced from the background display device 15, cannot be represented completely in focus (cf. FIG. 5). The degree of blurring can depend on the received lens data 29. For example, the blurring of the objects 92 and 93 in the representation 19 can increase with a largely opened diaphragm 97 and the accompanied small depth of focus 69 and can be reduced with a widely closed diaphragm 97. Through the blurring of objects 92 and 93, as well as a part of the object 94, which are already displayed in the representation 19 of the virtual background 21, it can be made possible for the optical image 39 of the representation 19 of the virtual background 21 generated by the camera 23 to approximate the theoretical image 41 which the camera 23 would generate when imaging the real background 20 corresponding to the virtual background 21 (cf. FIGS. 3A and 3B).

In order to be able to adjust the background regions 47 by means of the background display device 15 in such a way that the optical image 39 approximates the theoretical image 41, the memory 45 can have a database 65 in which, for example, assignment tables can be installed which can be directly read out by the calculation device 61 or the control device 25, and which assigns a respective sharpness region 70, 71 or 72 or a corresponding sharpness 73 to the background regions 47 dependent on the received lens data 29. Therefore, in such a database 65, in particular, setting instructions E can be stored directly which are assigned to the respective background regions 47 dependent on the received lens data 29 and which the control device 25 can directly implement to adjust the representation 19 of the virtual background 21 or the individual background regions 47. Furthermore, different models of the virtual background 21 which can be assigned to the respective lens data 29 and, in particular, combinations of lens setting values, can be stored in the database 65 or in the memory 45, whereby the control device 25, based on the respective model in dependence of the received lens data 29, can be configured to generate the representation 19 of the virtual background 21 or to adjust it by a change in the underlying model.

As an alternative to reading out such a database 65 or the memory 45, it can also be provided for, that the calculation device 61 is also configured to computationally determine the setting instructions E for the control device 25 for adjusting the representation 19 of the virtual background 21. For this purpose, the calculation device 61 can, in particular, be configured to calculate imaging parameters 63 for the optical image 39 which the camera 23 generates from the representation 19 of the virtual background 21, and imaging parameters 63 for the theoretical image 41, which the camera 23 would generate when imaging the real background 20, and to generate the setting instructions E for the control device 25 in such a way that the imaging parameters 63 of the optical image 39 approximate the imaging parameters 63 of the theoretical image 41.

FIGS. 6A to 6F show schematic beam paths through the lens 59 or the camera 23 at an upper point of the most distant object 93 for the representation 19 of the virtual background 21 and for the real background 20. For illustration purposes, the lens 59 is simplified and is formed or represented with only one lens 89, which guides incident light onto the image sensor 95. In principle, however, also more complex lens systems with, for example, several interacting lenses 89 can be provided for. The calculation device 61 can be designed, in particular, to determine imaging parameters 63 on the basis of such considerations or simulations or calculations of such beam paths through the respective lens 59, and to generate setting instructions E for adjusting the representation 19 of the virtual background 21. For such simulations, the calculation device 61 can additionally draw on information I about the lens 59 transmitted from the camera 23 to the data input 27 of the control device 25 in order to carry out the simulations, for example, by means of digital filters that correlate with the respective lens type, and to be able to determine lens-specific effects (cf. also FIG. 4).

In the example of FIG. 6A, a focusing distance D of the lens 59 or its focal length F is selected such that the background display device 15 and thus also the object 93 represented by way of the illumination apparatus 31 or the LED wall 33, are located within the focus of the camera 23. The lens 59 comprises the aforementioned diaphragm 97 with an adjustable diaphragm aperture B, through which rays 83, 85 and 87 emanating from the object 93 impinges the lens 89 which directs the rays 83, 85 and 87 onto the image sensor 95. Due to the focusing of the camera 23 on the background display device 15, each point represented on the illumination apparatus 31 and thus also the represented object 93 is sharply imaged as a point 99 on the image sensor 95. The sharpness 73 of the objects 91, 92, 93 and 94 in the optical image 39 thus depends essentially on the resolution of the image sensor 95 and the number of light-emitting diodes 35 per unit area which generates the representation 19 of the virtual background 21.

On the other hand, as FIG. 6B shows, the object 93 for the real background 20 corresponding to the virtual background 21 is not within the focus of the camera 23 but has the aforementioned distance 53 to the background display device 15 and therefore to the focus of the Camera 23. As a result, the rays 83, 85 and 87 do not hit the image sensor 95 exactly, but already meet in front of it such that a point of the object 93, when imaging the real background 20 by means of the camera 23, is represented as a circle of confusion 75 with a diameter 77 in the theoretical image 41.

For example, the calculation device 61 can be configured to determine for points or background regions 47 represented by one or more light-emitting diodes 35 such circles of confusion 75 for the virtual background 21 as well as the real background 20 corresponding to the virtual background 21, and to use these as an imaging parameter 63 or as a measure 67 for a blurring. For example, when focusing on the background display device 15, as in FIGS. 6A and 6B, a plurality of light-emitting diodes 35, shown as a point 99 or as a circle with a minimum diameter, can be set with the same brightness and colour, to recreate the circle of confusion 75 in the optical image 39 occurring in the theoretical image 41 of the real background 20. This is illustrated schematically in FIGS. 7A and 7B. For example, a relation between the diameter 77 of the circle of confusion 75 in the theoretical image 41 and the diameter of the point 99 or the circle with minimum diameter in the optical image 39 can be determined, in order to determine the number of light-emitting diodes 35 set identically to recreate the circle of confusion 75 in the optical image 39. In order to reproduce points, for example the brightest, in the background regions 47 as clear circles of confusion 75, and to be able to achieve for other regions a realistic blurring gradient, the calculation device 61 can, for example, draw on models of the virtual background 21 stored in the memory 45 or on the information I relating to the lens 59.

As an alternative to such a determining of the diameters 77 of the circles of confusion 75, the calculation device can also be configured to calculate a depth of field 69 of the lens 59 dependent on the received lens data 29, in particular the diaphragm aperture B, and taking into account the position information 49 for the background regions 47 can generate setting instructions E for adjusting the representation 19. For example, distances from background regions 47 to a rear and/or front hyperfocal plane can be used to assign the background regions 47 into respective sharpness regions 70, 71 and 72 and to determine corresponding setting instructions E for the control device 25. In addition, the control device 25 can be configured to control the background display device 15 to represent the background regions 47 or the objects 91, 92, 93 or 94 arranged within, with a sharpness 73 assigned to the respective sharpness regions 70, 71 or 72. Also, the depth of field 69 or the distances of the objects 91, 92, 93 and 94 in the real background 20 and in the virtual background 21 to the hyperfocal planes, can thus be used as a measure 67 of the blurring in order to adjust the representation 19 and thereby influence the optical image 39 generated by the camera 23.

Alternatively, or in addition to such imaging parameters 63 such as the diameter 77 of the circles of confusion 75 or the distances to the hyperfocal planes, which can serve as a measure 67 for a blurring of the background regions 47, the calculation device 61 can also be configured to determine a measure 79 for a brightness of the background regions 47 and is to be considered when determining setting instructions E for the control device 25. As the comparison between FIGS. 6A and 6B shows, the difference in the distance between the object 93 and the lens 89 of the lens 59 when imaging the virtual background 21 and when imaging the real background 20, in addition to the explained blurring effects also leads to the respective angle 81 between the outer rays 83 and 85, which start from the object 93 and reach the lens 89 and are directed onto the image sensor 95, differing from one another. Accordingly, the brightness of the object 93 in the optical image 39 of the representation 19 of the virtual background 21 differs from the brightness of the object 93 in the theoretical image 41 of the real background 20 corresponding to the virtual background 21. This can also be taken into account when adjusting the representation 19 in that, for example, the angle 81 will be considered as an imaging parameter 63 and in the real background objects that are further away, in particular the object 93, can be represented darker, so that the object 93 can be imaged with a brightness in the optical image 39 of the representation 19 of the virtual background 21 corresponding to or approximating the brightness when imaging the real background 20.

FIGS. 6C and 6D show schematically on the other hand the beam path from a point of the object 93 for a representation by means of the background display device 15 of a virtual background 21 or under the assumption of an imaging of a real background 20. In comparison to FIGS. 6A and 6B, here the diaphragm aperture B is increased, as a result of which the depth of field 69 is reduced.

As FIG. 6C shows, that also with this larger diaphragm aperture B, the object 93 in the representation 19 of the virtual background 21 is imaged sharply onto the image sensor 95 due to the focusing of the camera 23 on the background display device 15, so that in the optical image 39 only the brightness of the object 93 is increased. On the other hand, since the object 93 in the real background 20 is not positioned at the focusing distance D, the diameter 77 of the circle of confusion 75 registered on the image sensor 95 increases when the diaphragm 97 is opened due to the reduced depth of field 69. Also, with the diaphragm aperture B accompanied change in the brightness of the object 93, the optical image 39 differs from the theoretical image 41, since the angle 81 between the outer rays 83 and 85 do not change in the same way. By an appropriate adjusting of the representation 19 of the virtual background 21, it is possible to achieve such distance-dependent imaging effects 37 dependent on the received lens data 29, here for example, the emerging of circles of confusion 75 with a diameter dependent on the diaphragm aperture B, as well as, reproducing the change in brightness in the optical image 39 of the representation 19 of the virtual background 21 generated by the camera 23 and to obtain a natural bokeh corresponding to or approaching the theoretical image 41.

By calculating imaging parameters 63, for example, the diameters 77 of the circles of confusion 75, the depth of field 69 or the angle 81 between the rays 83 and 85, the calculation device 61, in dependence of the received lens data 29, for example the diaphragm aperture B, can generate setting instructions E for the control device 25 in order to bring the imaging parameters 63 of the optical image 39 closer to the imaging parameters 63 of the theoretical image 41. As such, the calculation device 61 can be configured to carry out in real time such calculations and the determination of setting instructions E, such that the representation 19 of the virtual background 21, for example during a recording of a film scene by means of the camera 23 continually dependent on the received lens data 29 or the changing lens setting values, can be adjusted in order to generate an optical image 39 by means of the camera which is as close as possible to the theoretical image 41 and has a natural and designated bokeh.

As an alternative or in addition to the diaphragm aperture B, the lens data 29 can, for example, also relate to the focusing distance D or the focal length F, which can also affect the optical image 39 or the theoretical image 41. In FIGS. 6E and 6F, the diaphragm aperture B corresponds to those of FIGS. 6A and 6B, whereas the focusing distance D, due to changing the focal length F as viewed from the camera, is positioned in an area in front of the background display device 15. For example, such a positioning can be provided for so as to focus a face of the actor 17 (cf. FIGS. 1 to 5).

Because of this change in the focusing distance D, the background display device 15 in FIG. 6E is also located outside the depth of field 69, so that a point of the object 93 represented by means of the background display device 15, is imaged as a circle of confusion 75 on the image sensor 95. Here too, the diameter 77 of the circle of confusion 75 differs however from that of the circle of confusion 75 in the theoretical image 41 of the point on the object 93 in the real background 20, as can be seen from the comparison with FIG. 6F. Also, here, by adjusting the representation 19 of the virtual background 21 in dependence of the received focal length F or focusing distance D, it can be achieved that the optical image 39 approximates the theoretical image 41. The calculation device 61 can be configured to perform such calculations for each one of the plurality of background regions 47 in order to enable continual and comprehensive adjustment of the representation 19 of the virtual background 21.

In addition to such settings to the lens 59, which influence the sharpness 73 or the brightness of the image of one of the objects 91, 92, 93 and 94, the position of the camera 23 can also require an adjustment of the representation 19 of the virtual background 21 in order to enable a realistic image 39 by means of the camera 23. In order to be able to check the position of the camera 23, the background display system 11 comprises a position determining device 57 which is configured to transmit to the control device 25 position data P relating to the camera (cf. FIG. 4). For this purpose, the position determining device 57 can comprise, for example, auxiliary cameras, not shown, which film the camera 23 and makes it possible to determine its position.

Figure 8B:
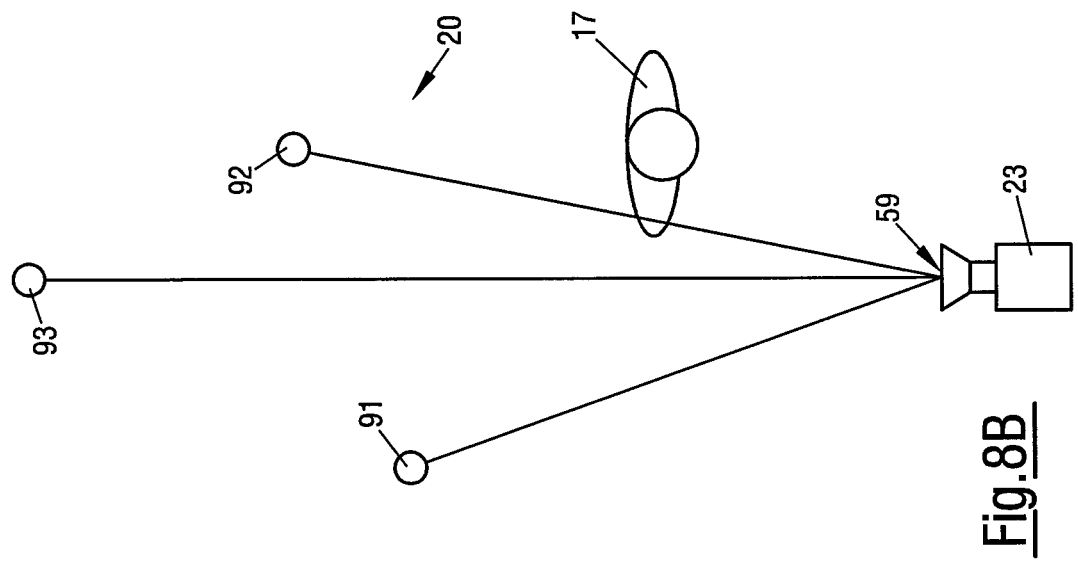
Figure 8A:
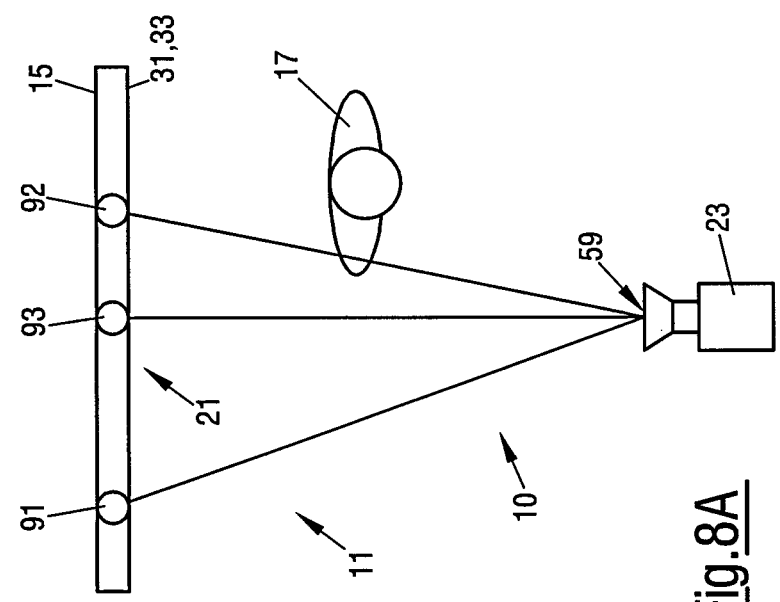
Figure 8D:
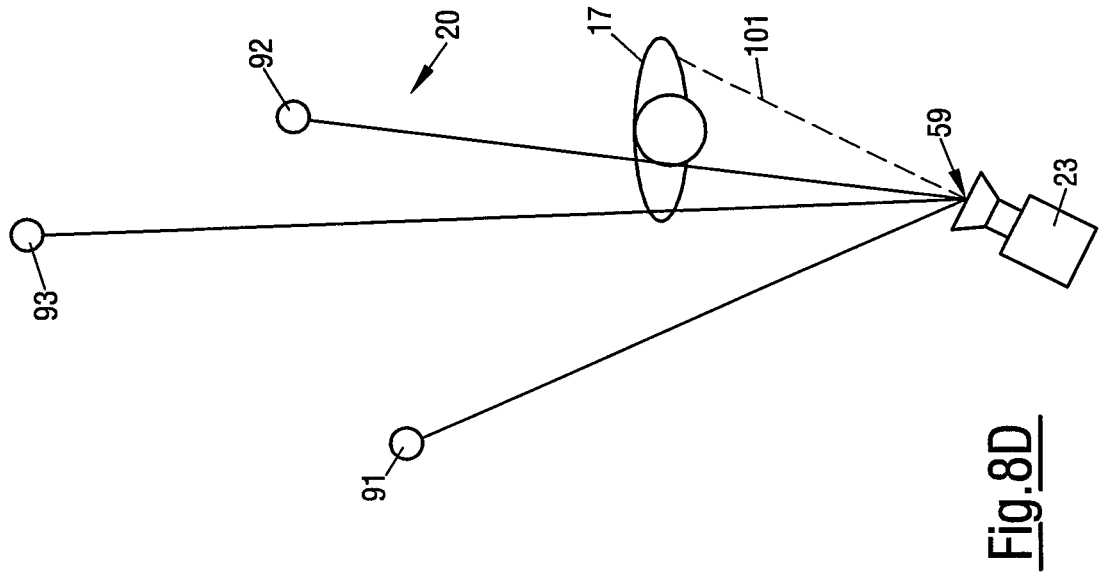
Figure 8C:
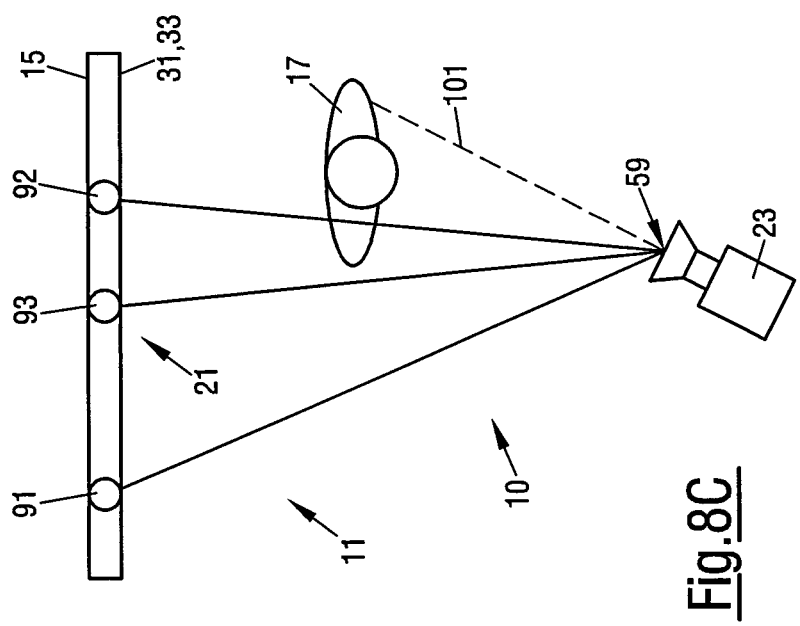

FIG. 8A shows the camera 23 with an optical axis 101 centrally aligned with the background display device 15. As such, the representation 19 of the virtual background 21 is generated in such a way that the angles of the objects 91, 92 and 93 to the optical axis 101 are equal to the angles of these objects 91, 92 and 93 in the real background 20 corresponding to the virtual background 21 (cf. FIG. 8B). If, however, the camera 23 is rotated and, for example, aimed at the actor 17, the angles of the objects 91, 92 and 93 to the optical axis 101 of the camera 23 in the representation 19 of the virtual background 21 and those in the real background 20 change differently, as illustrated in FIGS. 8C and 8D.

In order to be able to also correct this effect, the calculation device 61 can be configured to calculate those such angles of the objects 91, 92 and 93 for the real background 20 using a model of the virtual background 21 stored in the memory 45, and to generate setting instructions E for the control device 25 on the basis of which the representation 19 of the virtual background can be adjusted. The control device 25 can in addition be configured to position the objects 91, 92 and 93 on the background display device 15, starting from the original arrangement shown in FIGS. 8A and 8E, in such a way that the arrangement of the objects 91, 92 and 93 according to FIG. 8F corresponds to the expected arrangement when recording the real background 20 as shown in FIG. 8D.

Adjusting the representation 19 of the virtual background 21 in dependence of the received lens data 29 thus makes it possible to generate images 39 by means of such a background display device 15 which correspond to or approximate a realistic or a theoretical image 41 by a recording of the real background 20. In particular, a realistic texture or a realistic gradient of a distance-dependent blurring in the optical image 39 of the virtual background 21 and a bokeh, corresponding to or approximating the bokeh of the theoretical image 41, can be achieved.

LIST OF REFERENCE NUMBERS 10 recording system
11 background display system
13 image recording studio
15 background display device
17 real subject, actor
19 representation
20 real background
21 virtual background
23 camera
25 control device
27 data input
29 lens data
31 illumination apparatus
33 LED wall
351 light-emitting diode
37 image effect
39 image of the virtual background
41 theoretical image
43 three-dimensional scene
45 memory
47 background region
49 image information
51 position information
53 distance
54 distance
57 position determining device
59 camera lens, interchangeable lens
61 calculation device
63 imaging parameter
65 databank
67 measure for blurring
69 depth of field
70 sharpness region
71 sharpness region
72 sharpness region
73 sharpness
75 circle of confusion
77 diameter
79 measure for a brightness
81 angle between outer rays
83 first outer ray
85 second outer ray
87 beam
89 lens
91 first object
92 second object
93 third object
94 fourth object
95 image sensor
97 aperture
99 point
101 optical axis
B diaphragm aperture
D focusing distance
E setting instructions
F focal length
I information
P position data

What is claimed is:

1. A background display system for a virtual image recording studio comprising:
a background display device which is configured to display, behind or above a real subject, a representation of a virtual background for a recording by an associated camera, and
a control device which is configured to control the background display device,
wherein the control device comprises a data input for receiving lens data of the associated camera, and wherein the control device is configured to adjust the representation of the virtual background in dependence of the received lens data,
wherein the control device is connected to a memory in which the virtual background is stored as a model of sharp representation of the virtual background, the model of sharp representation having a first degree of blurring; and
wherein the control device is configured to increase a degree of blurring of the representation of the virtual background towards a second degree of blurring that is higher than the first degree of blurring if the received lens data indicates an increase of a set value of a diaphragm aperture of a camera lens of the associated camera that corresponds to an increased opening of the diaphragm aperture.

2. The background display system according to claim 1, wherein the background display device comprises a two-dimensionally extending active illumination apparatus.

3. The background display system according to claim 1, wherein the control device is designed to adjust the representation of the virtual background in such a way that an optical image of the representation generated by the camera in accordance with the received lens data approximates a theoretical image that would be generated if a real background corresponding to the virtual background was imaged by means of the associated camera.

4. The background display system according to claim 1, wherein the lens data represent set values of at least one of the following lens parameters of the associated camera:
a diaphragm aperture, a focusing distance or a focal length of a camera lens of the associated camera.

5. The background display system according to claim 1, wherein the control device is configured to receive position data of the associated camera at the data input and to adjust the representation of the virtual background in dependence of the received position data.

6. The background display system according to claim 1, wherein the lens data comprise information about a lens used in the associated camera, wherein the control device is configured to adjust the representation of the virtual background in dependence of the information about the lens used,
wherein the information represents at least one of: a lens type, an identification of the lens, a shape of a diaphragm of the lens, an arrangement of cylindrical elements of the lens or a coating of an optical element of the lens.

7. The background display system according to claim 1, wherein the control device is configured to adjust the representation of the virtual background in such a way that distance-dependent imaging effects that would arise if a real background corresponding to the virtual background was imaged by means of the associated camera in accordance with the received lens data are reproduced in an optical image of the representation of the virtual background generated by the camera.

8. The background display system according to claim 1, wherein the virtual background represents a three-dimensional scene and wherein the control device is configured to represent different regions of the three-dimensional scene with different sharpness depending on the received lens data.

9. The background display system according to claim 1, wherein the control device is connected to a memory in which the virtual background is stored as a model, wherein the control device is configured to generate the representation of the virtual background based on the stored model.

10. The background display system according to claim 9, wherein the stored model of the virtual background comprises respective image information and respective position information for a plurality of background regions, wherein the position information comprises distances of the background regions from the background display device, wherein the control device is configured to read out the distances and to consider the read distances when adjusting the representation of the virtual background.

11. The background display system according to claim 10, wherein the control device is configured to determine distances from the background regions to the camera and to adjust the representation of the virtual background in dependence on the determined distances.

12. The background display system according to claim 9, wherein the stored model of the virtual background comprises respective image information and respective position information for a plurality of background regions, wherein the control device is configured to generate the representation of the virtual background based on the image information stored for the plurality of background regions and to adjust the representation depending on the position information stored for the plurality of background regions and the received lens data.

13. The background display system according to claim 9, wherein setting instructions for the background display device dependent on the received lens data are stored in the memory,
wherein the control device is configured to control the background display device based on the setting instructions for adjusting the representation of the virtual background.

14. The background display system according to claim 1, wherein the control device is configured to adjust the representation of the virtual background in dependence on a distance from the background display device to the camera.

15. The background display system according to claim 1, wherein the control device is configured to adjust a sharpness of the representation of the virtual background in dependence of the received lens data, wherein the lens data represent set values of at least the following lens parameters of the associated camera: a diaphragm aperture, a focusing distance and a focal length of a camera lens of the associated camera.

16. A recording system having a background display system according to claim 1 and having a camera which comprises a camera lens and which is configured to transmit lens data of the camera lens to the data input of the control device.

17. The recording system according to claim 16, wherein the recording system comprises a position determining device which is configured to determine a position of the camera relative to the background display device and to transmit corresponding position data to the data input of the control device.

18. The recording system according to claim 17, wherein the control device is configured to use the position data to adjust the representation of the virtual background.

19. A method for controlling a background display device which is configured to display a representation of a virtual background behind or above a real subject for a recording by means of an associated camera, including the steps:
receiving lens data from the associated camera;
generating the representation of the virtual background based on a stored model of sharp representation of the virtual background, the model of sharp representation having a first degree of blurring;
adjusting the representation of the virtual background in dependence of the received lens data; and
increasing a degree of blurring of the representation of the virtual background towards a second degree of blurring that is higher than the first degree of blurring if the received lens data indicates an increase of a set value of a diaphragm aperture of a camera lens of the associated camera that corresponds to an increased opening of the diaphragm aperture.

20. The method according to claim 19, including the additional steps:
recording a real subject in front of the background display device by means of the associated camera;
acquiring lens data of a camera lens of the associated camera; and transmitting the lens data to the background display device or to a control device assigned to the background display device.

21. The method according to claim 19,
wherein the background display device comprises a two-dimensionally extending active illumination apparatus.

22. The method according to claim 19,
wherein the lens data represent set values of at least one of the following lens parameters:
a diaphragm aperture, a focusing distance or a focal length.

23. The method according to claim 19,
wherein the representation of the virtual background is adjusted in such a way that an optical image of the representation of the virtual background which can be generated by means of the associated camera in accordance with received lens data approximates a theoretical image that would be generated if a real background corresponding to the virtual background was imaged by means of the associated camera.

24. The method according to claim 19,
wherein the representation is adjusted in such a way that distance-dependent imaging effects are reproduced in an optical image of the representation of the virtual background.

25. The method according to claim 19,
wherein the representation of the virtual background is generated based on a model which is read out from a memory.

26. The method according to claim 19,
wherein the representation of the virtual background is adjusted in dependence of the received lens data such that different regions of the virtual background are represented with different sharpness.

27. The method according to claim 19,
wherein a sharpness of the representation of the virtual background is adjusted in dependence of the received lens data, wherein the lens data represent set values of at least the following lens parameters of the associated camera: a diaphragm aperture, a focusing distance and a focal length of a camera lens of the associated camera.

28. The method according to claim 19,
wherein the representation of the virtual background is generated based on a model including image information and position information for a plurality of background regions, wherein the position information includes at least one of distances between the background regions and the background display device or three-dimensional coordinates of the background regions.

* * * * *